US011403380B2

(12) United States Patent
Lu et al.

(10) Patent No.: US 11,403,380 B2
(45) Date of Patent: Aug. 2, 2022

(54) METHOD FOR MANAGING FINGERPRINT AND SYSTEM THEREOF

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 294 days.

(21) Appl. No.: 16/677,612

(22) Filed: Nov. 7, 2019

(65) Prior Publication Data

US 2020/0074062 A1    Mar. 5, 2020

Related U.S. Application Data

(63) Continuation of application No. PCT/CN2018/094627, filed on Jul. 5, 2018.

(30) Foreign Application Priority Data

May 9, 2018    (CN) .......................... 201810434979.1

(51) Int. Cl.
G06F 21/32       (2013.01)
G06F 21/41       (2013.01)
(Continued)

(52) U.S. Cl.
CPC .............. G06F 21/32 (2013.01); G06F 21/41 (2013.01); G06V 40/1312 (2022.01); G06V 40/1353 (2022.01); G06V 40/1365 (2022.01)

(58) Field of Classification Search
CPC ..... G06F 21/32; G06F 21/41; G06K 9/00033; G06K 9/00073; G06K 9/00087
See application file for complete search history.

(56) References Cited

U.S. PATENT DOCUMENTS 6,944,773 B1     9/2005   Abrahams
2001/0054149 A1  12/2001  Kawaguchi et al.
(Continued)

FOREIGN PATENT DOCUMENTS

CN      1353386 A      6/2002
CN    102413146 A      4/2012
(Continued)

OTHER PUBLICATIONS

The Chinese First Examination Report including the search report of corresponding Chinese application No. 201810434979.1, dated Dec. 24, 2018.
(Continued)

Primary Examiner — Lixi C Simpson
(74) Attorney, Agent, or Firm — J.C. Patents

(57) ABSTRACT

The present disclosure discloses a method for managing a fingerprint and a system thereof, which relates to the field of information technology. The method includes that an upper computer builds a connection with a fingerprint card; the upper computer receives an operation from a user and determines a type of the operation, the upper computer sends the collecting fingerprint instruction to the fingerprint card and the fingerprint card collects a fingerprint and returns a collecting fingerprint response to the upper computer if the operation is a collecting fingerprint operation; the upper computer sends the managing fingerprint instruction to the fingerprint card, the fingerprint card finishes a managing operation on the fingerprint according to the managing fingerprint instruction and returns the managing fingerprint response to the upper computer if the operation is a managing fingerprint operation; and the method further comprises the server authenticates the user information.

18 Claims, 16 Drawing Sheets

(51) Int. Cl.
*G06K 9/00* (2022.01)
*G06V 40/13* (2022.01)
*G06V 40/12* (2022.01)

(56) References Cited

U.S. PATENT DOCUMENTS

| | | | | |
|---|---|---|---|---|
| 2016/0063504 | A1* | 3/2016 | Ngabonziza | G06Q 20/32 705/76 |
| 2017/0223017 | A1* | 8/2017 | Kohli | H04L 63/18 |
| 2017/0337366 | A1* | 11/2017 | Lu | G06F 21/32 |
| 2018/0247313 | A1* | 8/2018 | Li | H04W 12/06 |
| 2021/0144008 | A1* | 5/2021 | Prager | G06K 9/00107 |

FOREIGN PATENT DOCUMENTS

| | | | |
|---|---|---|---|
| CN | 103117853 | A | 5/2013 |
| CN | 103186769 | A | 7/2013 |
| CN | 104392162 | A | 3/2015 |
| CN | 105868679 | A | 8/2016 |
| CN | 106022050 | A | 10/2016 |
| CN | 106570955 | A | 4/2017 |

OTHER PUBLICATIONS

The Chinese International Search Report of corresponding International application PCT/CN2018/094627, dated Feb. 13, 2019.

* cited by examiner

METHOD FOR MANAGING FINGERPRINT AND SYSTEM THEREOF

CROSS-REFERENCE TO RELATED APPLICATIONS

This application is a continuation of International Application No. PCT/CN2018/094627, filed on Jul. 5, 2018, which claims priority to Chinese Patent Application No. 201810434979.1, filed on May 9, 2018. The disclosures of the aforementioned applications are hereby incorporated by reference in their entireties.

TECHNICAL FIELD

The present disclosure relates to the field of information technology, specifically to a method for managing a fingerprint and a system thereof.

BACKGROUND

With the development of the technology, a fingerprint card can be combined with a standard card, which also looks like the standard card in physical form on one hand and reaches the requirements of the physical performance of the standard card on the other hand. In the prior art, if a user wants to activate a fingerprint card, he or she needs to go to a bank outlet to input a fingerprint with the help of a special work member by using an assigned inputting tool, such as a mobile phone or a pad with an inputting fingerprint function, then the assigned inputting tool transfers the assigned fingerprints to the fingerprint card. However, the process cannot guarantee that the transformation of the fingerprints input by the inputting tool to the fingerprint card is safe enough, meanwhile the user needs to go to the bank outlet to input the fingerprints which is not convenient for the user. In addition, the user cannot manage the fingerprints, causing poor user experience.

SUMMARY

The object of the present disclosure is to provide a method for managing a fingerprint and a system to solve the problems in the prior art.

The present disclosure provides a method for managing a fingerprint, including:

Step S1, building, by an upper computer, a connection with a fingerprint card;

Step S2, accepting, by the upper computer, an operation from a user;

Step S3, determining, by the upper computer, a type of the operation from the user, in the case that the type of the operation from the user is a collecting operation, where the upper computer sends a collecting fingerprint instruction to the fingerprint card, the fingerprint card collects fingerprints and returns a collecting fingerprint response to the upper computer; and the upper computer sends a managing fingerprint instruction to the fingerprint card, the fingerprint card manages the fingerprints according to the managing fingerprint instruction and returns a managing fingerprint response to the upper computer in the case that the type of the operation is a managing fingerprint operation;

where Step S1 further includes that the server receives user information sent from the upper computer and authenticates the user information.

The present disclosure provides a system for managing a fingerprint, which includes an upper computer, a fingerprint card and a server;

the upper computer specifically includes:

a connecting module which is configured to build a connection with the fingerprint card;

a first operating module which is configured to accept an operation from a user;

a first determining module which is configured to determine a type of the operation in the first operating module from the user;

a first sending module which is configured to send a collecting fingerprint instruction to the fingerprint card when the first determining module determines that the operation from the user is a collecting fingerprint operation; and further configured to send a managing fingerprint instruction to the fingerprint card when the first determining module determines that the operation from the user is a managing fingerprint operation;

a first receiving module which is configured to receive a collecting fingerprint response returned from the fingerprint card; is further configured to receive a managing fingerprint response returned from the fingerprint card;

the fingerprint card specifically includes:

a second receiving module which is configured to receive the collecting fingerprint instruction sent from the upper computer; and further configured to receive the managing fingerprint instruction sent from the upper computer;

a collecting module which is configured to collect fingerprints according to the collecting fingerprint instruction received by the second receiving module to obtain the collecting fingerprint response;

a second operating module which is configured to manage the fingerprints according to the managing fingerprint instruction received by the second receiving module to obtain the managing fingerprint response;

a second sending module which is configured to return the collecting fingerprint response obtained by the collecting module to the upper computer; is further configured to return the managing fingerprint response obtained by the second operating module to the upper computer;

the server specifically includes:

a third receiving module which is configured to receive the user information sent from the upper computer;

an authenticating module which is configured to authenticate the user information received by the third receiving module.

The beneficial effects of the present disclosure are that a user can collect a fingerprint anytime and anywhere by using the technical solution of the present disclosure without help of any specific collecting device, and the management of the fingerprint by the use is achieved, causing good user experience.

BRIEF DESCRIPTION OF DRAWINGS

The technical solutions in the embodiments of the present disclosure are further described more clearly and completely with the drawings of the present disclosure. Apparently, the drawings described below are just a few embodiments of the present disclosure. On the basis of the drawings of the present disclosure, all other drawings can be obtained by those skilled in the art without any inventive work.

DESCRIPTION OF EMBODIMENTS

Figure 1A:
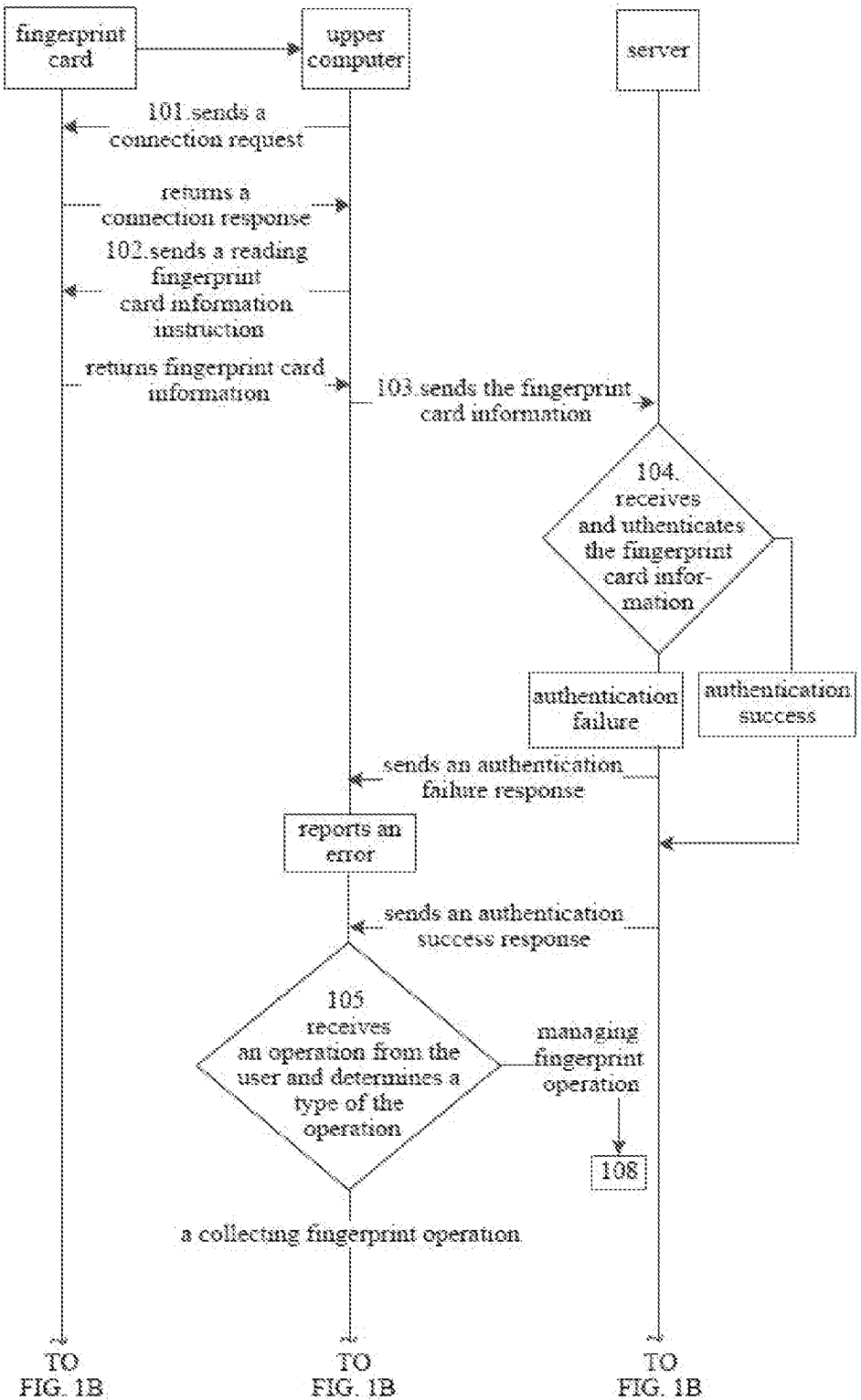
FIGS. 1A-1B show a flow diagram of a method for managing a fingerprint according to Embodiment 2 of the present disclosure.

The technical solutions in the embodiments of the present disclosure are further described more clearly and completely with the drawings of the present disclosure. Apparently, the embodiments described herein are just a few embodiments of the present disclosure, rather than all the embodiments. On the basis of embodiments of the present disclosure, all other related embodiments made by those skilled in the art without any inventive work belong to the scope of the present disclosure.

Embodiment 1

It provides a method for managing a fingerprint according to Embodiment 1 which applies to a system including a fingerprint card, an upper computer and a server, in which, the upper computer is a mobile terminal, a Personal Computer (PC) or a card reader which can be installed applets; and the present system further includes a terminal which specifically is a mobile terminal receiving an incoming call message or information. The method for managing a fingerprint specifically includes:

Step S1, the upper computer builds a connection with the fingerprint card;

Step S2, the upper computer receives an operation from a user;

Step S3, the upper computer determines a type of the operation from the user, the upper computer sends a collecting fingerprint instruction to the fingerprint card, the fingerprint card collects the fingerprints and returns a collecting fingerprint response to the upper computer in the case that the operation is a collecting fingerprint operation; and the upper computer sends the managing fingerprint instruction to the fingerprint card, the fingerprint card manages the fingerprints according to the managing fingerprint instruction and returns a managing fingerprint response to the upper computer in the case that the operation is a managing fingerprint operation; and Step S1 further includes that the server receives user information sent from the upper computer and authenticates the user information.

Optionally, the upper computer building a connection with the fingerprint card specifically includes the upper computer sends a connecting request to the fingerprint card; and the fingerprint card returns a connecting response to the upper computer.

Optionally, after the server authenticates the user information, the method further includes that the upper computer reads information of the fingerprint card and sends the information of the fingerprint card to the server for being authenticated, the server sends an authentication success response to the upper computer if the information of the fingerprint card is authenticated successfully, and the upper computer executes Step S2; and the server sends an authentication failure response to the upper computer if the information of the fingerprint card is authenticated unsuccessfully, and the upper computer reports an error.

Optionally, reading the information of the fingerprint card specifically is that the upper computer sends reading information of fingerprint card instruction to the fingerprint card and receives information of the fingerprint card returned from the fingerprint card.

Optionally, before the information of the fingerprint card is read, the method further includes that the upper computer receives an authentication password input by a user and sends it to the server, the server authenticates the authentication password and sends an authentication success response to the upper computer if the authentication password is authenticated successfully, and the upper computer reads the information of the fingerprint card; and the server sends a authentication password failure response to the upper computer if the authentication password is authenticated unsuccessfully, and the upper computer reports an error.

Optionally, the server authenticating the authentication password specifically includes that the server determines whether the authentication password from the user is identical with an authentication password generated by the server itself, if yes, the authentication password from the user is authenticated successfully; otherwise, the authentication password from the user is authenticated unsuccessfully.

Optionally, before the upper computer receives the authentication password input by the user, the method further includes the upper computer receives the information of the fingerprint card input by the user, and sends the information of the fingerprint card to the server; and the server obtains a preset terminal number according to the information of the fingerprint card input by the user after the server receives the information of the fingerprint card input by the user sent by the upper computer, and sends the authentication password generated by itself to a corresponding terminal according to the terminal number.

Optionally, the authentication by the server specifically includes the server determines whether the information of the fingerprint card input by the user is identical with the information of the fingerprint card read by the upper computer, if yes, the authentication is successful; otherwise, the authentication is unsuccessful.

Optionally, the upper computer reading the information of the fingerprint card and sending the information to the server for being authenticated specifically includes that the server receives the information of the fingerprint card sent from the upper computer, obtains information of an applicant according to the information of the fingerprint card, and determines whether the information of the applicant matches the user information sent from the upper computer, if yes, sends an authentication success response to the upper computer; otherwise, sends an authentication failure response to the upper computer.

Optionally, Step S1 further includes the upper computer obtains user information and sends the user information to the server;

The server authenticating the user information specifically is that the server searches information from its own database and compares the information found from its own database with the obtained user information, and sends a user information authentication success response to the upper computer in the case that the user information is found from the database and compared successfully; otherwise, the server sends a user information authentication failure response to the upper computer.

Optionally, after the server authenticates the user information, the method further includes that the user obtains the information of the fingerprint card from its own database according to the user information, obtains information of an applicant according to the information of the fingerprint card, and determines whether the information of the applicant matches with the user information sent from the upper computer, if yes, sends the authentication success response to the upper computer; otherwise, sends the authentication failure response to the upper computer.

Optionally, before the upper computer sends the collecting fingerprint instruction to the fingerprint card, the method further includes that the upper computer obtains fingerprint information from the fingerprint card and determines whether there is any fingerprint input in the fingerprint card according to the fingerprint information, if yes, the method comes to an end; otherwise, sends the collecting fingerprint instruction to the fingerprint card.

Optionally, the upper computer obtaining the fingerprint information from the fingerprint card specifically is that the upper computer sends the obtaining fingerprint information instruction to the fingerprint card; and the fingerprint card returns the fingerprint information to the upper computer.

Optionally, determining whether there is any fingerprint input in the fingerprint card according to the fingerprint information specifically is that the upper computer determines whether there is any fingerprint input according to the number of the fingerprints of the fingerprint information.

Optionally, after the fingerprint card collects the fingerprints, the method further includes that the fingerprint card numbers the collected fingerprints.

Optionally, the managing fingerprint instruction includes adding fingerprint instruction; and the managing fingerprint instruction is sent to the fingerprint card, the fingerprint card manages the fingerprints according to the managing fingerprint instruction and sends the managing fingerprint response to the upper computer, specifically: that the upper computer sends the adding fingerprint instruction to the fingerprint card, the fingerprint card collects the fingerprints and returns the adding fingerprint response to the upper computer.

Optionally, before the upper computer sends the adding fingerprint instruction to the fingerprint card, the method further includes that the upper computer obtains the fingerprint information in the fingerprint card and determines whether any fingerprint can be added according to the fingerprint information, if yes, sends the collecting fingerprint instruction to the fingerprint card; otherwise, fails to add fingerprints and reports an error.

Optionally, determining whether any fingerprint can be added according to the fingerprint information specifically is that the upper computer determines whether the number of the fingerprints in the fingerprint information equals a first preset value, if yes, no fingerprint can be added; otherwise, the fingerprint can be added.

Optionally, the managing fingerprint instruction includes a deleting fingerprint instruction; and the managing fingerprint instruction is sent to the fingerprint card, the fingerprint card manages the fingerprints according to the managing fingerprint instruction, and returns the managing fingerprint response to the upper computer, specifically: the upper computer sends the deleting fingerprint instruction to the fingerprint card, and the fingerprint card deletes the fingerprint and returns the deleting fingerprint response to the upper computer.

Optionally, before the upper computer sends the deleting fingerprint instruction to the fingerprint card, the method further includes that the upper computer obtains the fingerprint information from the fingerprint card, and determines whether any fingerprint can be deleted according to the fingerprint information, if yes, sends the deleting fingerprint instruction to the fingerprint card; otherwise, fails to delete the fingerprint and an error is reported.

Optionally, determining whether any fingerprint can be deleted according to the fingerprint information specifically is that the upper computer determines whether the number of the fingerprints in the fingerprint information equals a second preset value, if yes, no fingerprint can be deleted; otherwise, there is fingerprint which can be deleted.

Optionally, the method further includes that the collected fingerprints are numbered;

optionally, before determining whether any fingerprint can be deleted according to the fingerprint information, the method further includes that the upper computer receives serial numbers of the fingerprints which will deleted by the user;

the upper computer sending the deleting fingerprint instruction to the fingerprint card specifically is that the upper computer sends the deleting fingerprint instruction including the serial numbers of the fingerprints which will be deleted to the fingerprint card; and the fingerprint card deleting the fingerprints specifically is that the fingerprint card finds corresponding fingerprints according to the serial number of the fingerprints which will be deleted and deletes the found fingerprints.

Optionally, the fingerprint card collecting the fingerprints further includes that the fingerprint card determines whether any fingerprint of a user is collected in a preset duration, if yes, returns the fingerprint collecting success response to the upper computer; otherwise, returns a collecting fingerprint overtime response to the upper computer.

Optionally, the upper computer sending the collecting fingerprint instruction to the fingerprint card specifically is that the upper computer sends the collecting fingerprint instruction to the server, the server encrypts the collecting fingerprint instruction and sends an collecting fingerprint instruction which is encrypted to the upper computer, and the upper computer sends the collecting fingerprint instruction which is encrypted received to the fingerprint card.

Optionally, the server encrypting the collecting fingerprint instruction and sending the collecting fingerprint instruction which is encrypted to the upper computer specifically includes that the server uses a first key which is preset to encrypt the collecting fingerprint instruction via a first preset algorithm to obtain the collecting fingerprint instruction which is encrypted, and sends the collecting fingerprint instruction which is encrypted to the upper computer.

Optionally, the server encrypting the collecting fingerprint instruction and sending the collecting fingerprint instruction which is encrypted to the upper computer specifically includes that the server operates a second preset algorithm on the collecting fingerprint instruction by using a second key which is preset to generate a first check value, and sends the collecting fingerprint instruction and the first check value to the upper computer.

Optionally, the server encrypting the collecting fingerprint instruction and sending the collecting fingerprint instruction which is encrypted to the upper computer specifically includes that the server uses the first key which is preset to encrypt the collecting fingerprint instruction sent from the upper computer via the first preset algorithm to obtain the collecting fingerprint instruction which is encrypted, and then operates the second preset algorithm on the collecting fingerprint instruction by using the second key which is preset to generate the first check value, and sends the collecting fingerprint instruction which is encrypted and the first check value to the upper computer.

Optionally, the upper computer sending the managing fingerprint instruction to the fingerprint card specifically includes that the upper computer sends the managing fingerprint instruction to the server, the server encrypts the managing fingerprint instruction and sends an encrypted managing fingerprint instruction to the upper computer, and the upper computer sends the encrypted managing fingerprint instruction received to the fingerprint card.

Optionally, the server encrypting the managing fingerprint instruction and sending the encrypted managing fingerprint instruction to the upper computer specifically includes that the server uses the first key which is preset to encrypt the managing fingerprint instruction via the first preset algorithm to obtain the encrypted managing fingerprint instruction, and sends the encrypted managing fingerprint instruction to the upper computer.

Optionally, the server encrypting the managing fingerprint instruction and sending the encrypted managing fingerprint instruction to the upper computer specifically includes that the server operates the second preset algorithm on the managing fingerprint instruction by using the second key which is preset to generate the first check value, and sends the encrypted managing fingerprint instruction and the first check value to the upper computer.

Optionally, the server encrypting the managing fingerprint instruction and sending the encrypted managing fingerprint instruction to the upper computer specifically includes that the server uses the first key which is preset to encrypt the managing fingerprint instruction sent from the upper computer via the first preset algorithm to obtain the encrypted managing fingerprint instruction, and then operates the second preset algorithm on the managing fingerprint instruction by using the second key which is preset to generate the first check value, and sends the encrypted managing fingerprint instruction and the first check value to the upper computer.

Embodiment 2

Figure 1B:
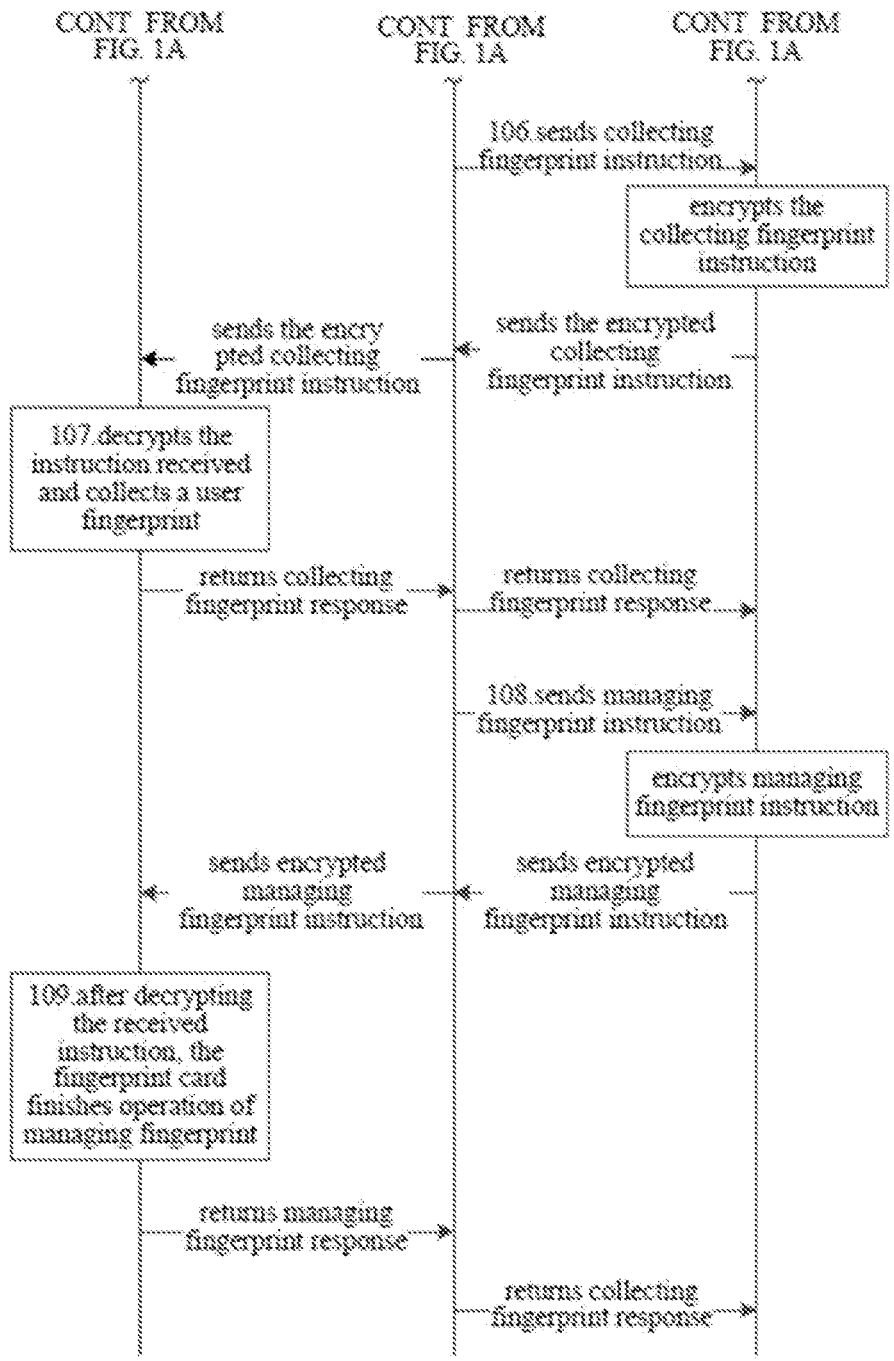

It provides a method for managing a fingerprint according to Embodiment 2, which applies to a system which includes a fingerprint card, an upper computer and a server, in which, the upper computer is a mobile terminal, a PC or a card reader which can be installed applets; and the system further includes a terminal which specifically is a mobile terminal receiving an incoming call massage and information. As shown in FIGS. 1A-1B, the method specifically includes:

Step 101, an upper computer sends the connection request to the fingerprint card, and the fingerprint card returns a connecting response;

In Embodiment 2, before Step 101, the method further includes that the upper computer receives user information input by a user and sends the user information to the server to be authenticated, the server searches from its own database and compares the found information with the user information according to the obtained user information, and sends a user information authentication success response to the upper computer if the user information is searched and compared successfully, goes to Step 101; otherwise, sends a user information authentication failure response to the upper computer.

Step 102, the upper computer sends a reading fingerprint card information instruction to the fingerprint card, and the fingerprint card returns the fingerprint card information;

Step 103, the upper computer sends the fingerprint card information to the server; and Step 104, the server receives and authenticates the fingerprint card information, and sends an authentication success response to the upper computer if the fingerprint card information is authenticated successfully, goes to Step 105; and the server sends an authentication failure response to the upper computer if the fingerprint card information is authenticated unsuccessfully, and the upper computer reports an error.

Optionally, the method further includes that the upper computer receives the fingerprint card information input by the user and sends the fingerprint card information to the server;

the server receives and authenticates the fingerprint card information specifically includes that the server authenticates whether the fingerprint card information input by the user which is received from the upper computer is the same as the fingerprint card information which is read and is received from the upper computer, if yes, the fingerprint information is authenticated successfully; otherwise, the fingerprint information is authenticated unsuccessfully;

optionally, the method further includes that the upper computer receives an authentication password input by the user and sends the authentication password to the server for being authenticated;

specifically, after receiving the authentication password input by the user, the upper computer sends the authentication password to the server, and the server authenticates whether the authentication password received by the upper computer is the same as the authentication password generated by the server, if yes, the authentication password is authenticated successfully; otherwise, the authentication password is authenticated unsuccessfully;

more specifically, before the upper computer receives the authentication password input by the user, the method further includes that the server obtains a preset terminal number according to the fingerprint card information input by the user, and sends the authentication password generated by the server to a corresponding terminal according to the terminal number; and the user enters the authentication password received by the terminal into the upper computer;

optionally, the method further includes that the upper computer obtains the user information and sends the user information to the server;

the server authenticating the fingerprint card information specifically includes that the server obtains corresponding applicant information according to the fingerprint card information, and determines whether the information of an applicant obtained matches the user information sent from the upper computer, if yes, the fingerprint card information is authenticated successfully; otherwise, the fingerprint card information is authenticated unsuccessfully;

Step 105, the upper computer receives an operation from the user and determines a type of the operation, goes to Step 106 in the case that the operation received is a collecting fingerprint operation; and goes to Step 108 in the case that the operation received is a managing fingerprint operation;

Step 106, the upper computer sends a collecting fingerprint instruction to the server, the server encrypts the collecting fingerprint instruction and sends the collecting fingerprint instruction which is encrypted to the upper computer; and the upper computer sends the collecting fingerprint instruction which is encrypted to the fingerprint card;

the server encrypts the instruction received from the upper computer by using a first key which is preset via a first preset algorithm, and sends the encrypted instruction to the upper computer;

or, the server operates a second preset algorithm on the instruction received from the upper computer by using a preset second key to generate a first check value, and sends the instruction received from the upper computer and the first check value to the upper computer;

or, the server encrypts the instruction received from the upper computer by using the first key which is preset via the first preset algorithm, and operates the second preset algorithm on the instruction received from the upper computer by using the second key which is preset to generate the first check value, and sends the encrypted instruction and the first check value to the upper computer;

Step 107, after the fingerprint card decrypts the instruction received, the fingerprint card collects a fingerprint of a user and returns a collecting fingerprint response to the upper computer, and the upper computer returns the collecting fingerprint response to the server;

optionally, the fingerprint card decrypts the instruction received from the upper computer by using the first key which is preset via the first preset algorithm to obtain a plaintext of the instruction;

or, after receiving the instruction sent from the upper computer, the fingerprint card operates the second preset algorithm on the instruction by using the second key which is preset to generate the second check value, and determines whether the second check value is the same as the first check value received, if yes, operates according to the instruction received from the upper computer; otherwise, returns error information to the upper computer;

or after receiving the instruction sent from the upper computer, the fingerprint card operates the second preset algorithm on the instruction by using the second key which is preset to generate the second check value, and determines whether the second check value is the same as the first check value received, if yes, operates the first key which is preset to decrypt the instruction sent from the upper computer via the first preset algorithm to obtain the plaintext of the instruction and operates according to the instruction; otherwise, returns error information to the upper computer;

Step 108, the upper computer sends the managing fingerprint instruction to the server, and the server encrypts the managing fingerprint instruction and sends the managing fingerprint instruction which is encrypted to the upper computer; and the upper computer sends the managing fingerprint instruction which is encrypted to the fingerprint card; and Step 109, the fingerprint card decrypts the received instruction, the fingerprint card finishes operation of managing fingerprint, and returns the managing fingerprint response to the upper computer, and the upper computer returns the collecting fingerprint response to the server.

Optionally, before the upper computer sends the collecting fingerprint instruction to the fingerprint card, the method further includes that the upper computer obtains the fingerprint information from the fingerprint card, and determines whether the fingerprint card has input an fingerprint according to the fingerprint information, if yes, ends the method; otherwise, sends the collecting fingerprint instruction to the fingerprint card, the fingerprint card collects the fingerprint and returns the collecting fingerprint response to the upper computer;

specifically, the upper computer determines whether there is any fingerprint input according to the number of fingerprints in the fingerprint information;

optionally, in the case that the managing fingerprint instruction specifically is an adding fingerprint instruction, the upper computer sends the adding fingerprint instruction to the fingerprint card, the fingerprint card collects the fingerprints and returns an adding fingerprint response to the upper computer;

optionally, before the upper computer sends the adding fingerprint instruction to the fingerprint card, the method further includes that the upper computer obtains the fingerprint information from the fingerprint card, and determines whether any fingerprint can be added in according to the fingerprint information, if yes, sends the adding fingerprint instruction to the fingerprint card; otherwise, fails to add fingerprint and reports an error;

specifically, the upper computer determining whether any fingerprint can be added in according to the fingerprint information specifically includes that the upper computer determines whether the number of fingerprints in the fingerprint information equals a first preset value, if yes, no fingerprint can be added in; otherwise, a fingerprint can be added in;

correspondingly, the collecting fingerprint response returned by the upper computer specifically includes that the fingerprint is collected successfully, the fingerprint is collected unsuccessfully and the fingerprint is collected overtime;

optionally, after the fingerprint card collects the fingerprint, the method further includes that numbers the collected fingerprints;

correspondingly, in the case that the collecting fingerprint response returned from the upper computer is collecting the fingerprint successfully, the collecting fingerprint response further includes the corresponding numbers of the collected fingerprints;

optionally, in the case that the managing fingerprint instruction specifically is a deleting fingerprint instruction, the deleting fingerprint instruction is sent to the fingerprint card, and the fingerprint card deletes the fingerprint and returns the deleting fingerprint response to the upper computer;

optionally, before the upper computer sends the deleting fingerprint instruction to the fingerprint card, the method further includes that the upper computer obtains the fingerprint information from the fingerprint card, and determines whether any fingerprint can be deleted according to the fingerprint information, if yes, sends the deleting fingerprint instruction to the fingerprint card; otherwise, fails to delete the fingerprint and reports an error;

specifically, the upper computer determines whether the number of fingerprints in the fingerprint information equals the second preset value, if yes, fails to delete the fingerprint and report an error; otherwise, sends the deleting fingerprint instruction to the fingerprint card; and optionally, the deleting fingerprint instruction sent to the fingerprint card further includes the serial number of the fingerprint which will be deleted.

Embodiment 3

Figure 2A:
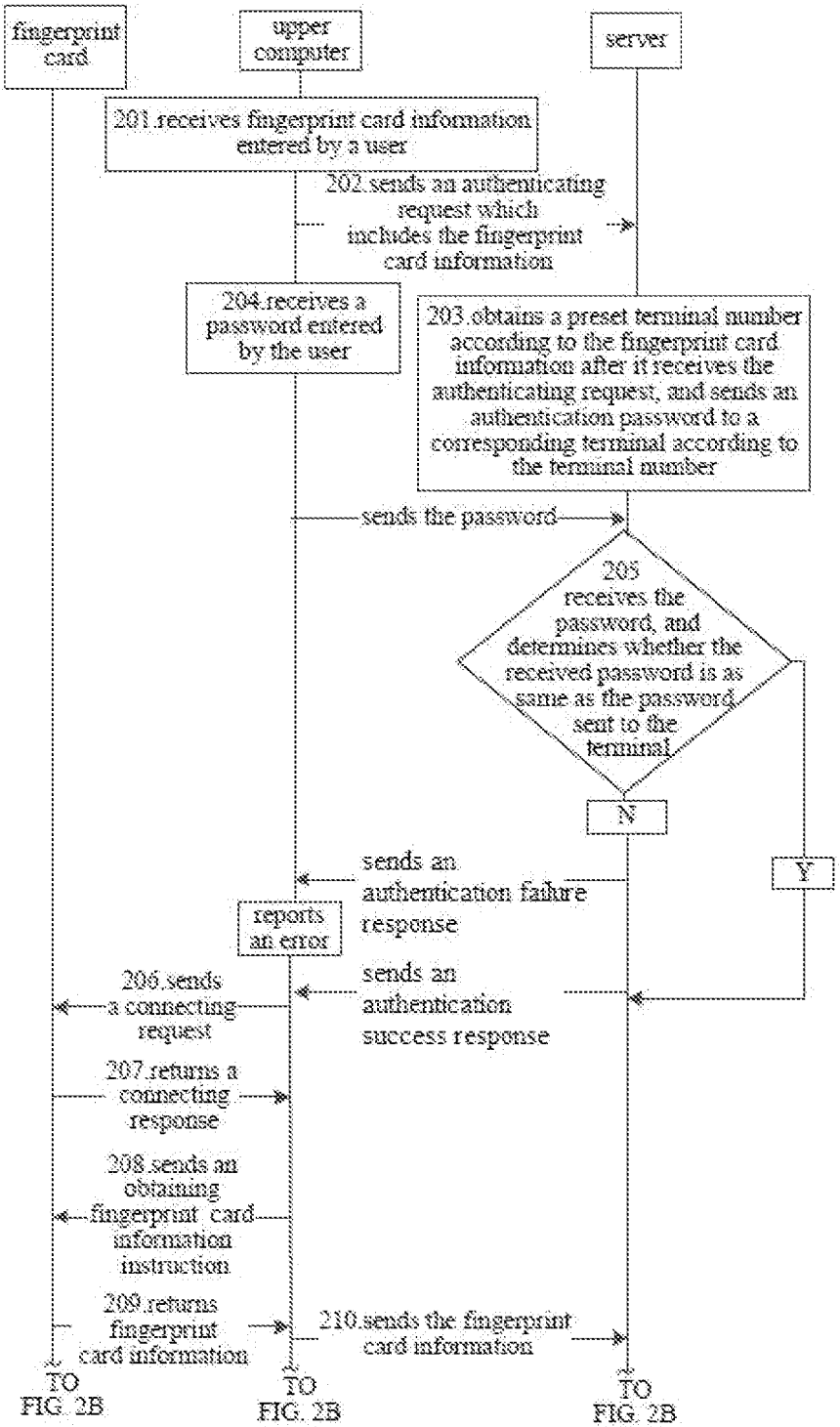
FIGS. 2A-2C show a flow diagram of a method for managing a fingerprint according to Embodiment 3 of the present disclosure.
Figure 2B:
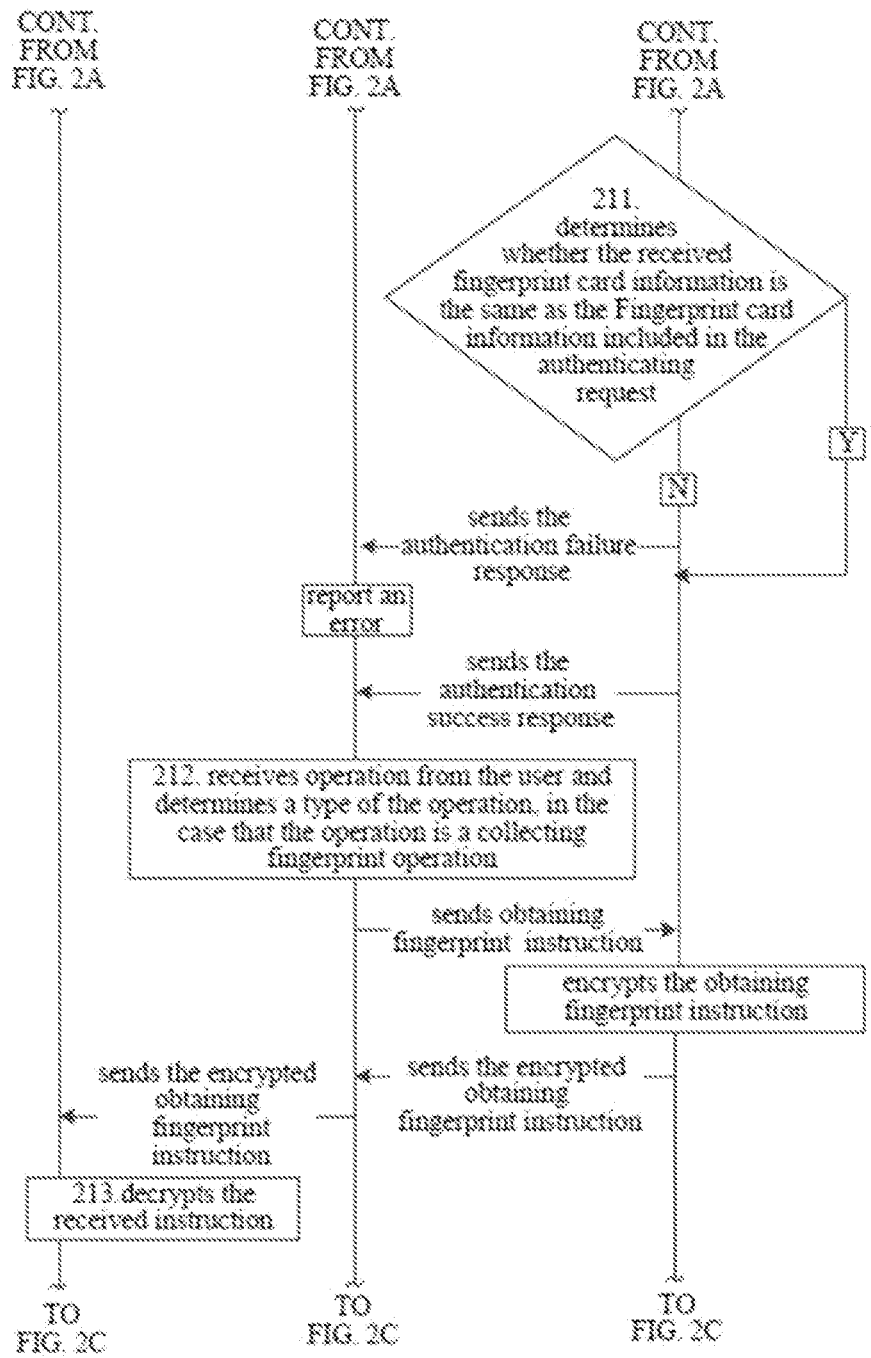
Figure 2C:
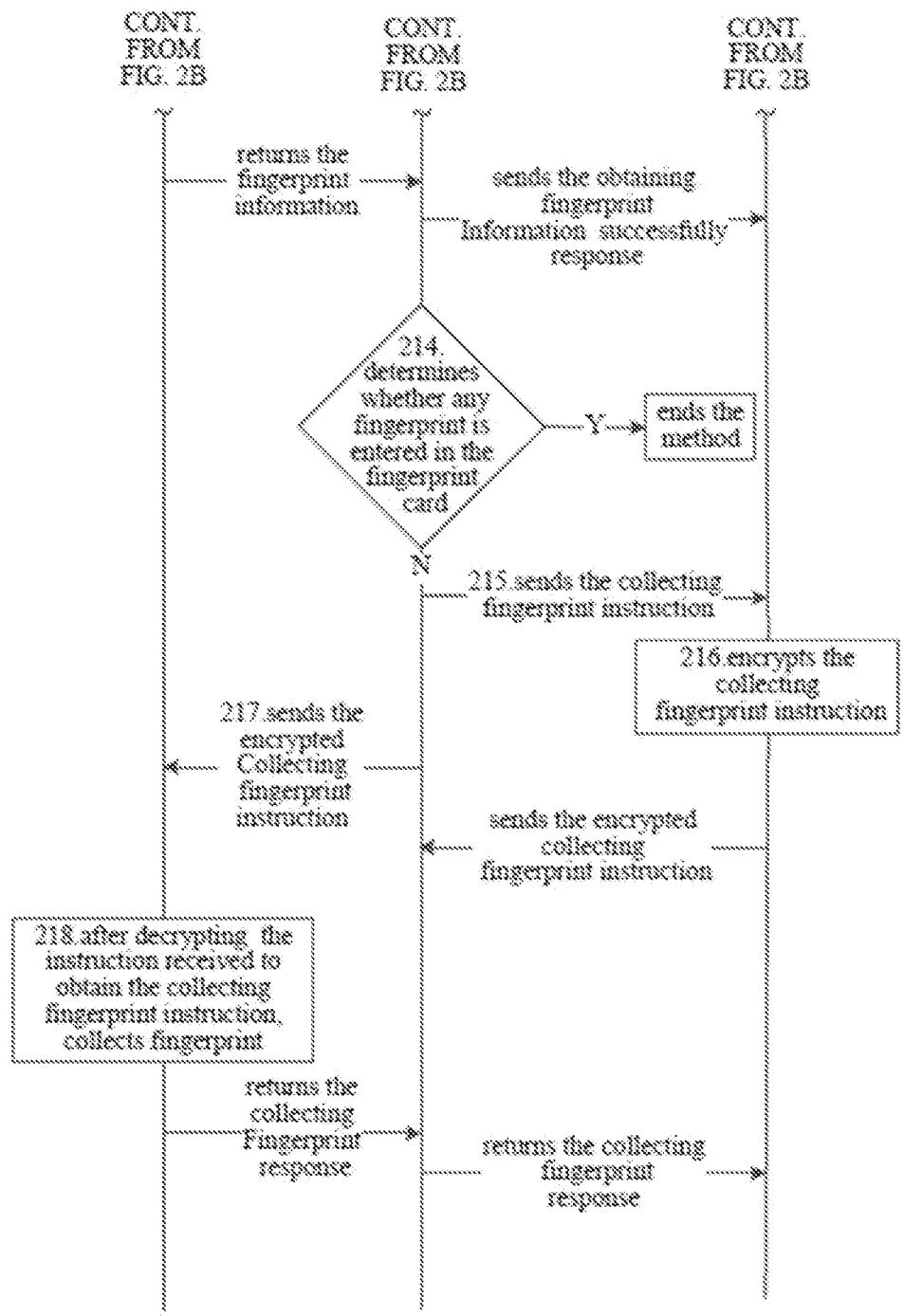
Figure 3A:
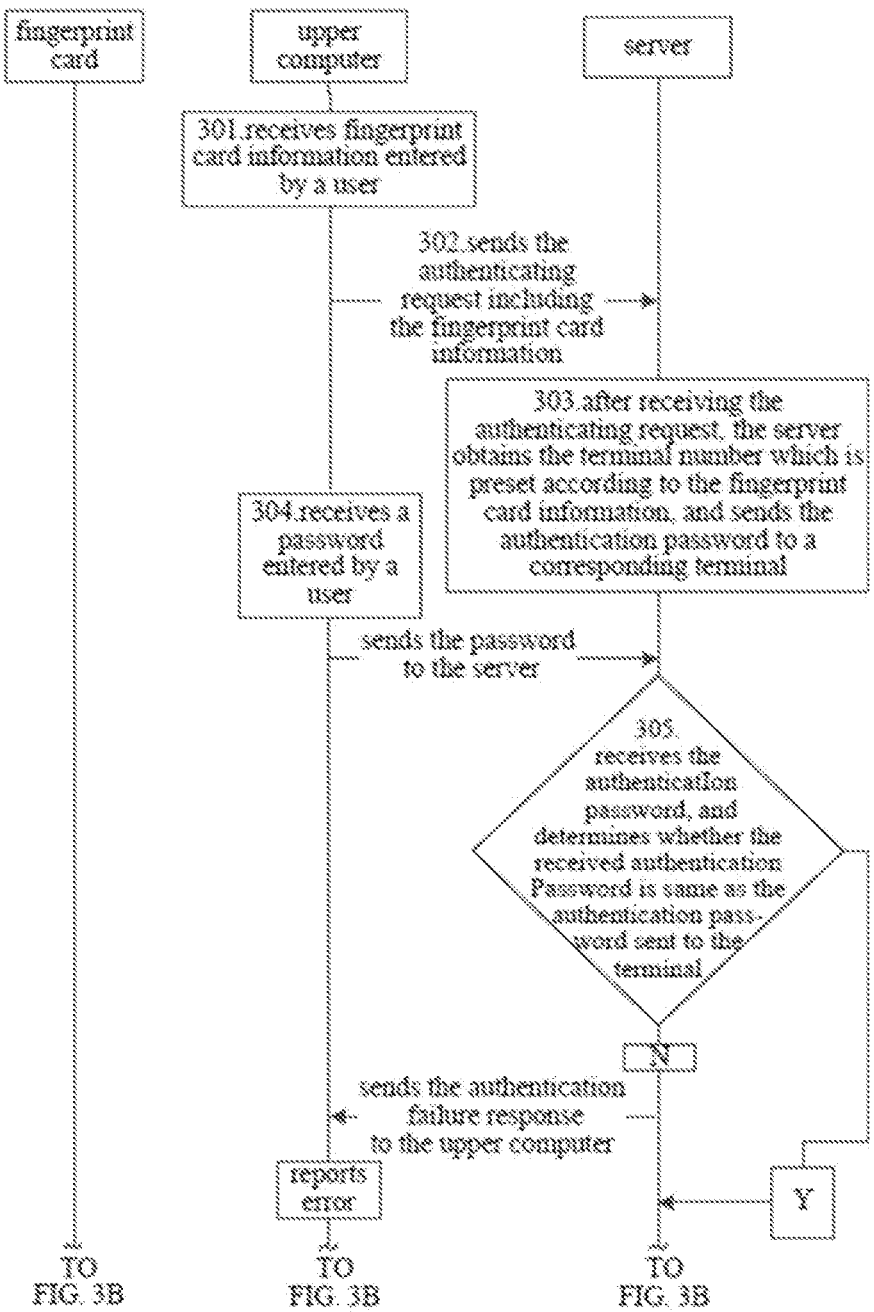
FIGS. 3A-3B and FIGS. 4A-4C show a flow diagram of a method for managing a fingerprint according to Embodiment 4 of the present disclosure.
Figure 3B:
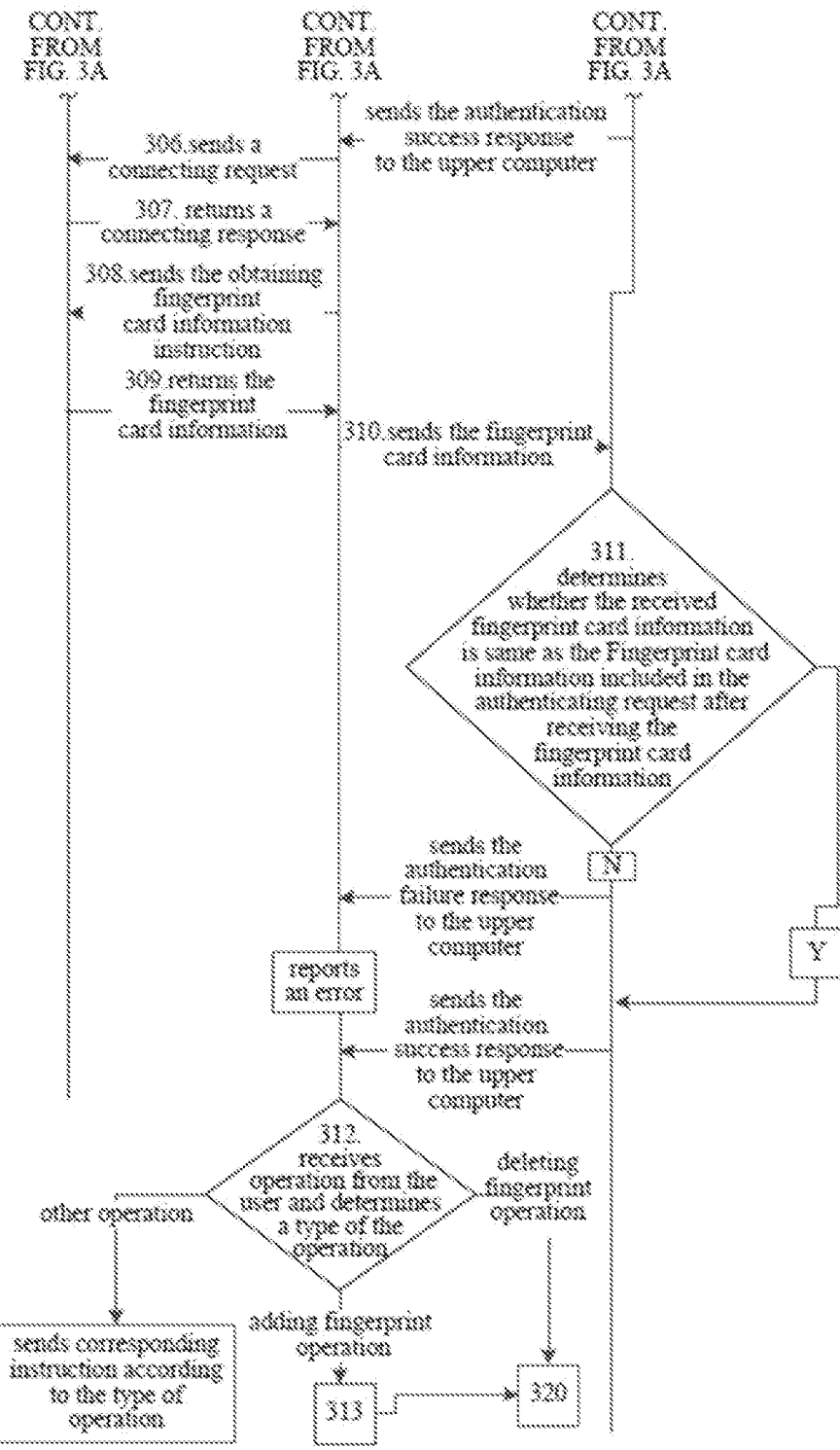
Figure 4A:
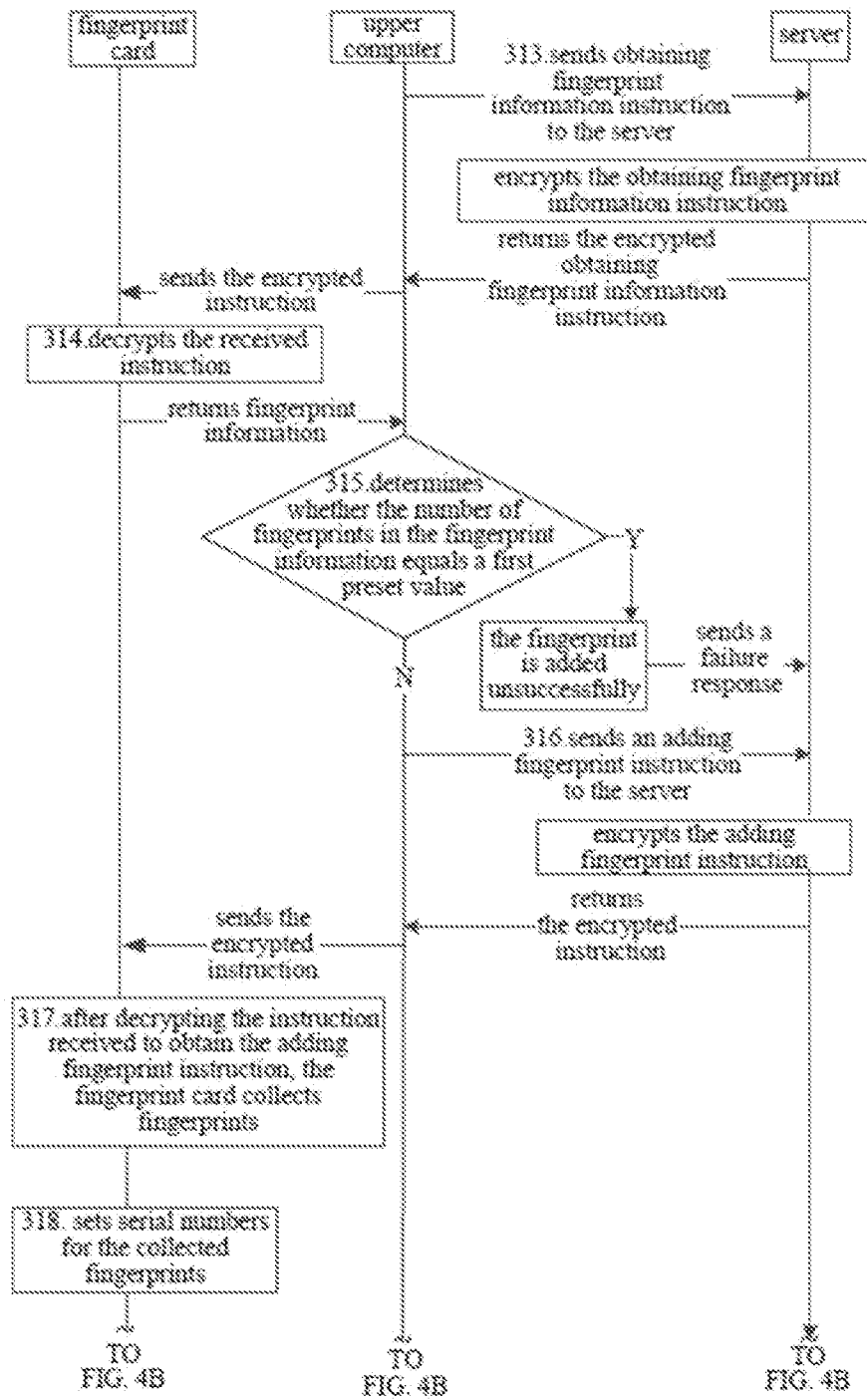
Figure 4B:
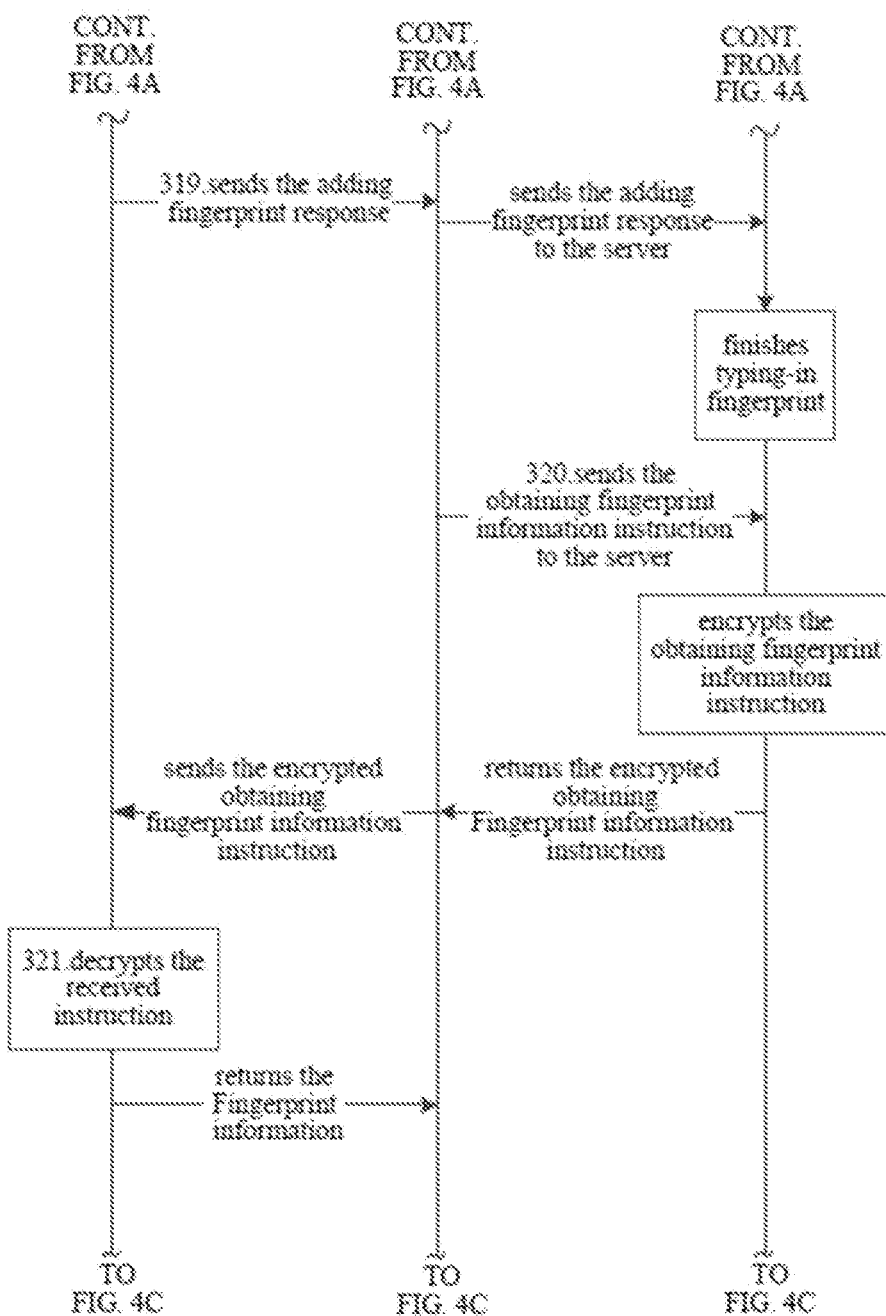
Figure 4C:
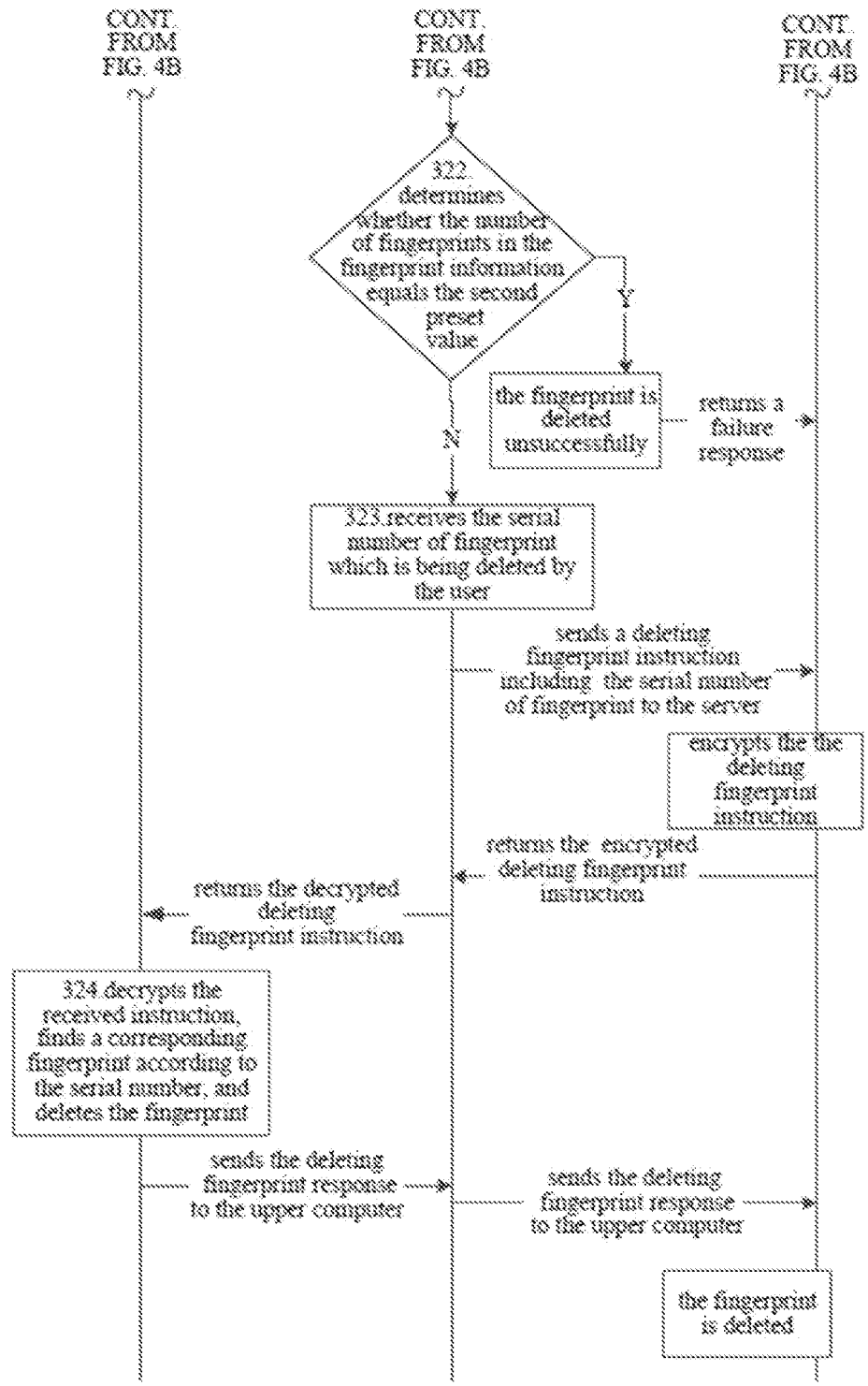

It provides a method for managing a fingerprint according to Embodiment 3, which applies to a system which includes a fingerprint card, an upper computer and a server, in which, the upper computer can be a mobile terminal, a PC or a card reader which can be equipped with applets; and the system further includes a terminal which specifically is a mobile terminal which can receive an incoming call massage and information. As shown in FIGS. 2A-2C, the method specifically includes:

Step 201, the upper computer receives fingerprint card information entered by a user;

in Embodiment 3, the fingerprint card information specifically includes a card number of the fingerprint card, a name and an ID number of an applicant, an expiry data and a safety code, etc.

for instance, the card number of the fingerprint card is 6222 1111 1111 0000;

it needs to be noted that before Step 201, the method further includes that the upper computer receives user information entered by the user and sends the user information to the server to be authenticated, the server searches from its own database according to the obtained user information and compares the information, sends the user information authentication success response to the upper computer in the case that the information is found and compared successfully; otherwise, sends the user information authentication failure response to the upper computer.

Step 202, the upper computer sends an authenticating request which includes the fingerprint card information to the server;

Step 203, the server obtains a preset terminal number which is preset according to the fingerprint card information after it receives the authenticating request, and sends an authentication password to a corresponding terminal according to the terminal number;

preferably, the server sends the authentication password to a terminal corresponding to the terminal number according to the preset terminal number via a massage or an email, etc.

For instance, the authentication password is 123456.

Step 204, the upper computer receives an authentication password entered by the user and sends the authentication password to the server;

Step 205, the server receives the authentication password, and determines whether the received password is the same as the authentication password sent to the terminal, if yes, sends an authentication success response to the upper computer and goes to Step 206; otherwise, sends an authentication failure response to the upper computer, and the upper computer reports an error;

Step 206, the upper computer sends a connecting request to the fingerprint card;

preferably, before Step 206, the method further includes that the upper computer decides a way for connecting with the fingerprint card;

specifically, the upper computer can connect with the fingerprint card via a Bluetooth, Wi-Fi, NFC (Near Field Communication) or a card reader equipment.

In Embodiment 3, a Bluetooth connection will be taken as an example, after connecting with the fingerprint card by taking the Bluetooth as the connection way, the upper computer determines whether its own Bluetooth function is enabled, if no, enables the Bluetooth; if yes, chooses a fingerprint card from a Bluetooth list and connects with the fingerprint card via the Bluetooth.

It needs to be noted that the fingerprint card is powered on before the upper computer connects with the fingerprint card via the Bluetooth;

specifically, the fingerprint card can be powered on by connecting a supply line with a power supply unit; or can be powered on via its own power supply unit.

Step 207, the fingerprint card returns a connecting response to the upper computer;

specifically, in the case that the fingerprint card connects with the upper computer successfully, the fingerprint card sends a connection success response to the upper computer, goes to Step 208; in the case that the fingerprint card fails to connect with the upper computer, the fingerprint card sends a connection failure response to upper computer;

optionally, the Bluetooth indicator lamp of the fingerprint card changes from a flashing state to a normally on state in the case that upper computer connects with the fingerprint card successfully via the Bluetooth.

Step 208, the upper computer sends an obtaining fingerprint card information instruction to the fingerprint card;

In Embodiment 3, the fingerprint card information specifically includes a card number of a fingerprint card, a name and an ID number of an applicant, an expire data and safety code, etc.

Specifically, the obtaining fingerprint card information instruction sent from the upper computer to the fingerprint card is 00B2010000;

Step 209, the fingerprint card returns the fingerprint card information to the upper computer;

specifically, the fingerprint card information returned from the fingerprint card to the upper computer is 5A5F245F25, including a bank card number, application expire date and application effective date.

Step 210, the upper computer sends the fingerprint card information to the server;

Step 211, the server determines whether a received fingerprint card information is the same as the fingerprint card information included in the authenticating request after receiving the fingerprint card information, if yes, sends an authentication success response to the upper computer, goes to Step 212; otherwise, sends an authentication failure response to the upper computer, and the upper computer reports an error;

specifically, in Embodiment 3, the upper computer sends a reading card number and applicant name data instruction to a financial application of the fingerprint card via an applet, sends data returned from the fingerprint card and information entered by a user on an information entered interface of a fingerprint card to the server and the server compares the data with the information, if the data is the same as the information, returns the authentication success response to the upper computer; otherwise, returns the authentication failure response to the upper computer, and the upper computer reports an error.

Step 212, the upper computer receives an operation from the user and determines a type of the operation, in the case that the operation is a collecting fingerprint operation, sends the obtaining fingerprint information instruction to the server, the server encrypts the obtaining fingerprint instruction and sends the encrypted obtaining fingerprint instruction to the upper computer, and the upper computer sends the encrypted obtaining fingerprint card instruction to the fingerprint card;

in Embodiment 3, the server encrypts the obtaining fingerprint information instruction sent from the upper computer by using the first key which is preset via the first preset algorithm to obtain an obtaining fingerprint information instruction ciphertext, and sends the encrypted instruction to the upper computer;

or, the server operates the second preset algorithm on the obtaining fingerprint information instruction sent from the upper computer by using the second key which is preset to generate a first check value, and sends the instruction sent from the upper computer and the first check value to the upper computer;

or, after the server encrypts the obtaining fingerprint information instruction sent from the upper computer by using the first key which is preset via the first preset algorithm to obtain the obtaining fingerprint information instruction ciphertext, the server operates the second preset algorithm on the instruction by using the second key which is preset to generate a first check value, and sends the obtaining fingerprint information instruction ciphertext and the first check value to the upper computer;

in Embodiment 3, the fingerprint information specifically includes the number of fingerprints and the serial number of the fingerprints which are stored in the fingerprint card.

Specifically, the obtaining fingerprint information instruction is A55A5100;

Step 213, the fingerprint card decrypts the received instruction, returns the fingerprint information to the upper computer, and the upper computer sends the obtaining fingerprint information successfully response to the server;

in Embodiment 3, the fingerprint card encrypting the received instruction specifically is that the fingerprint card decrypts the obtaining fingerprint information instruction ciphertext sent from the upper computer by using the first key which is preset via the first preset algorithm to obtain the obtaining fingerprint information instruction plaintext;

or, after the fingerprint card receives the instruction sent from the upper computer, the fingerprint card operates the second preset algorithm on the instruction by using the second key which is preset to generate a second check value, determines whether the second check value is the same as the first check value, if yes, obtains the fingerprint information according to the obtaining fingerprint information instruction sent from the upper computer; otherwise, returns error information to the upper computer;

or, after the fingerprint card receives the instruction sent from the upper computer, the fingerprint card operates the second preset algorithm on the instruction by using the second key which is preset to generate the second check value, and determines whether the second check value is the same as the first check value, if yes, decrypts the obtaining fingerprint information instruction ciphertext by using the first key which is preset via the first preset algorithm to obtain the fingerprint information; otherwise, returns error information to the upper computer;

Step 214, the upper computer determines whether any fingerprint is entered in the fingerprint card, if yes, ending the procedure; otherwise, goes to Step 215;

specifically, the upper computer determines whether any fingerprint is entered in the fingerprint card according to the number of the fingerprints in the fingerprint information.

Step 215, the upper computer sends the collecting fingerprint instruction to the server;

specifically, the collecting fingerprint instruction sent from the upper computer to the server is 80D2000100.

Step 216, the server encrypts the collecting fingerprint instruction and sends the collecting fingerprint instruction which is encrypted to the upper computer;

In Embodiment 3, Step 216 specifically includes:

the server encrypts the collecting fingerprint instruction sent from the upper computer by using the first key which is preset via the first preset algorithm to obtain the collecting fingerprint instruction ciphertext, and sends the collecting fingerprint instruction which is encrypted to the upper computer;

or, the server operates the second preset algorithm on the collecting fingerprint instruction sent from the upper computer by using the second key which is preset to generate the first check value, and sends the instruction sent from the upper computer and the first check value to the upper computer;

or, after the server encrypts the collecting fingerprint instruction sent from the upper computer by using the first key which is preset via the first preset algorithm to obtain the collecting fingerprint instruction ciphertext, the server operates the second preset algorithm on the instruction sent from the upper computer by using the second key which is preset to generate the first check value, and sends the collecting fingerprint instruction ciphertext and the first check value to the upper computer; and it needs to be noted that the server obtains the first key and/or the second key according to the fingerprint card information and resets the first key and/or the second key in the server; correspondingly, before the fingerprint card is issued, the server needs to send the first key and/or the second key to the fingerprint card and saves the first key and/or the second key.

Optionally, the first key and the second key can be one same key or two different keys.

Step 217, the upper computer sends the collecting fingerprint instruction which is encrypted to the fingerprint card; and Step 218, after parsing the instruction received to obtain the collecting fingerprint instruction, the fingerprint card collects a fingerprint and returns a collecting fingerprint response to the upper computer, and the upper computer returns the collecting fingerprint response to the server, and ends the procedure.

In Embodiment 3, the fingerprint card parsing the instruction received specifically is that the fingerprint card decrypts the collecting fingerprint instruction ciphertext sent from the upper computer by using the first key which is preset via the first preset algorithm to obtain the collecting fingerprint instruction plaintext;

or, after receiving the instruction sent from the upper computer, the fingerprint card operates the second preset algorithm on the instruction by using the second key which is preset to generate the second check value, and determines whether the second check value is the same as the first check value received, if yes, collects the fingerprints according to the collecting fingerprint instruction sent from the upper computer; otherwise, returns error information to the upper computer;

or, after receiving the instruction sent from the upper computer, the fingerprint card operates the second preset algorithm on the instruction by using the second key which is preset to generate the second check value, determines whether the second check value is the same as the first check value, if yes, the fingerprint card decrypts by using the first key which is preset via the first preset algorithm to obtain the collecting fingerprint instruction plaintext and collects the fingerprint; otherwise, returns error information to the upper computer;

in Embodiment 3, after the fingerprint card collects the fingerprint, the method further includes that a number of the fingerprint is set corresponding to the fingerprint; correspondingly, the fingerprint entered response returned from the fingerprint card to the upper computer includes the number of the fingerprint.

In Embodiment 3, the collecting fingerprint response includes the fingerprint is collected successfully, the fingerprint is collected unsuccessfully and the fingerprint is collected overtime.

In Embodiment 3, the method further includes that the fingerprint card determines whether a fingerprint of a user is collected in a preset duration, if yes, returns the response that the fingerprint is collected successfully; otherwise, returns the response that the fingerprint is collected overtime to the upper computer;

optionally, in Embodiment 3, steps from Step 201 to Step 211 can be instituted by steps from Step 201' to Step 211', which includes:

Step 201', the upper computer sends a connecting request to the fingerprint card;

Step 202', the fingerprint card returns a connecting response to the upper computer;

Step 203', the upper computer sends the obtaining fingerprint card information instruction to the fingerprint card;

Step 204', the fingerprint card returns the fingerprint card information to the upper computer;

Step 205', the upper computer sends the fingerprint card information to the server;

Step 206', the upper computer receives the fingerprint card information entered by the user;

Step 207', the upper computer sends an authenticating request which includes the fingerprint card information to the server;

Step 208', after receiving the authenticating request, the server determines whether the fingerprint card information included in the authenticating request is the same as the fingerprint card information received by the server, if yes, returns the authentication success response to the upper computer, and goes to Step 209'; otherwise, returns the authentication failure response to the upper computer, and the upper computer reports an error;

Step 209', the server obtains a terminal number which is preset according to the fingerprint card information in the authenticating request, and sends an authenticating password to a corresponding terminal according to the terminal number;

Step 210', the upper computer receives an authenticating password entered by a user, and sends the authenticating password to the server;

Step 211', the server receives the authenticating password, and determines whether the authenticating password received is the same as the authenticating password sent to the terminal, if yes, sends the authentication success response to the upper computer, and goes to Step 212; otherwise, sends the authentication failure response to the upper computer, and the upper computer reports an error;

optionally, in Embodiment 3, steps that from Step 206 to Step 207 can be executed before Step 201.

Embodiment 4

It provides a method for managing a fingerprint according to Embodiment 4, which applies to a system including a fingerprint card, an upper computer and a server, in which, the upper computer can be a mobile terminal, a PC or a card reader which can be equipped with applets; and the system further includes a terminal which specifically is a mobile terminal, the said mobile terminal can receive an incoming call massage or information. As shown as FIGS. 3A-3B and FIGS. 4A-4C, the method specifically includes:

Step 301, the upper computer receives fingerprint card information entered by a user;

in Embodiment 4, the fingerprint card information specifically includes a card number of the fingerprint card, a name and an ID number of an applicant, an expire date and a safety code, etc.

It needs to be noted that before Step 301, the method further includes that the upper computer receives the user information entered by the user and sends the user information to the server to be authenticated, the server searches from the database of the server and compares according to the user information, if the user information is found and compares successfully, sends the a user information authentication success response to the upper computer; otherwise, sends the a user information authentication failure response to the upper computer.

Step 302, the upper computer sends the authenticating request which includes the fingerprint card information to the server;

Step 303, after receiving the authenticating request, the server obtains the terminal number which is preset according to the fingerprint card information, and sends an authentication password to a corresponding terminal according to the terminal number;

preferably, the server sends the authentication password to the terminal corresponding to the terminal number which is preset through the ways such as telephony, a message or an email.

For instance, the authentication password is 123456.

Step 304, the upper computer receives an authentication password entered by the user and sends the authentication password to the server;

Step 305, the server receives the authentication password, and determines whether the received authentication password is the same as the authentication password sent to the terminal, if yes, sends the authentication success response to the upper computer, and goes to Step 306; otherwise, sends an authentication failure response to the upper computer, and the upper computer reports an error;

Step 306, the upper computer sends the connecting request to the fingerprint card;

preferably, before Step 306, the method further includes that the upper computer choose a way for connecting to the fingerprint card;

specifically, the upper computer can connect with the fingerprint card via Bluetooth, Wi-Fi, NFC or a card reader equipment.

In Embodiment 4, a Bluetooth connection is taken as an example, after the upper computer connects with the fingerprint card via Bluetooth, it determines whether Bluetooth function of the upper computer is enabled, if no, enables Bluetooth; if yes, chooses a fingerprint card from a system Bluetooth list and connects with the fingerprint card via Bluetooth.

It needs to be noted that the upper computer needs to power on the fingerprint card before connecting with the fingerprint card via Bluetooth;

specifically, the fingerprint card can connect with the supply equipment via supply lines to be powered on, or can be powered on via its own supply equipment.

Step 307, the fingerprint card returns a connecting response to the upper computer;

specifically, in the case that the fingerprint card connects with the upper computer successfully, the fingerprint card sends the response that the connecting is successful to the upper computer, and goes to Step 308; in the case that the fingerprint card connects with the upper computer unsuccessfully, the fingerprint card sends a connection failure response to the upper computer;

optionally, in the case that the upper computer tries to connect with the fingerprint card via Bluetooth and the connection is successful, a Bluetooth indicator light of the fingerprint card changes from a flashing state to a normally on state.

Step 308, the upper computer sends the obtaining fingerprint card information instruction to the fingerprint card;

Step 309, the fingerprint card returns the fingerprint card information to the upper computer;

Step 310, the upper computer sends the fingerprint card information to the server;

Step 311, the server determines whether the received fingerprint card information is the same as the fingerprint card information included in the authenticating request after receiving the fingerprint card information, if yes, sends an authentication success response to the upper computer, and goes to Step 312; otherwise, sends an authentication failure response to the upper computer, and reports an error;

Step 312, the upper computer receives an operation from the user and determines a type of the operation, and goes to Step 313 in the case that the operation is an adding fingerprints operation; goes to Step 320 in the case that the operation is a deleting fingerprint operation; and sends a corresponding instruction according to the type of operation in the case that the operation is another operation;

Step 313, the upper computer sends the obtaining fingerprint information instruction to the server, the server encrypts the obtaining fingerprint information instruction and returns the obtaining fingerprint information instruction which is encrypted to the upper computer, and the upper computer sends the obtaining fingerprint information instruction which is encrypted to the fingerprint card;

In Embodiment 4, the details about the server encrypting the obtaining fingerprint information instruction are shown in Step 212 in Embodiment 3, no more details will be given herein.

Step 314, the fingerprint card decrypts the received instruction and returns fingerprint information to the upper computer;

in Embodiment 4, details about that the fingerprint card decrypting the obtaining fingerprint information instruction which is encrypted are shown in Step 213 in Embodiment 3, no more details will be given herein.

Step 315, the upper computer determines whether the number of fingerprints in the fingerprint information equals a first preset value, if yes, fingerprint is added unsuccessfully, and a failure response is sent to the server; otherwise, goes to Step 316;

in Embodiment 4, in the case that the number of fingerprints in the fingerprint information equals the first preset value, no fingerprint can be added, thus fingerprint is added unsuccessfully.

Step 316, the upper computer sends an adding fingerprint instruction to the server, and the server encrypts the adding fingerprint instruction and returns the adding fingerprint instruction which is encrypted to the upper computer; and the upper computer sends the adding fingerprint instruction which is encrypted to the fingerprint card;

the server encrypts the adding fingerprint instruction sent from the upper computer by using the first key which is preset via the first preset algorithm to obtain an adding fingerprint instruction ciphertext, and sends the adding fingerprint instruction which is encrypted to the upper computer;

or, the server operates the adding fingerprint instruction sent from the upper computer by using the second key which is preset via the second preset algorithm to generate a first check value, and sends the adding fingerprint instruction sent from the upper computer and the first check value to the upper computer;

or, after encrypting the adding fingerprint instruction sent from the upper computer by using the first key which is preset via the first preset algorithm to obtain the adding fingerprint instruction ciphertext, the server operates the instruction sent from the upper computer by using the second key which is preset via the second preset algorithm to generate the first check value, and sends the adding fingerprint instruction ciphertext and the first check value to the upper computer; and it needs to be noted that the server obtains the first key and/or the second key according to the fingerprint card information and presets the first key and/or the second key in the server; correspondingly, the server needs to send the first key and/or the second key to the fingerprint card and save them before the fingerprint card is issued.

Step 317, after decrypting the instruction received to obtain the adding fingerprint instruction, the fingerprint card collects fingerprints;

in Embodiment 4, the fingerprint card decrypting the instruction received specifically includes that the fingerprint card decrypts the adding fingerprint instruction ciphertext sent from the upper computer by using the first key which is preset via the first preset algorithm to obtain adding fingerprint instruction plaintext;

or, after receiving the instruction sent from the upper computer, the fingerprint card operates the second preset algorithm on the received instruction by using the second key which is preset to generate the second check value, and determines whether the second check value is the same as the received first check value, if yes, adds fingerprints according to the adding fingerprint instruction sent from the upper computer; otherwise, returns error information to the upper computer;

or, after receiving the instruction sent from the upper computer, the fingerprint card executes the second preset algorithm on the received instruction by using the second key which is preset to generate the second check value, and determines whether the second check value is the same as the received first check value, if yes, uses the first key which is preset to execute the first preset algorithm to decrypt to obtain the adding fingerprint instruction plaintext and adds fingerprints; otherwise, reports error information to the upper computer;

in Embodiment 4, the fingerprint card collects fingerprint data for several times according to the instruction sent from the server via the upper computer, the fingerprint card will send adding fingerprint response to the upper computer after it finishes the collection for each time; specifically, the adding fingerprint response includes the fingerprint is added successfully, the fingerprint is added unsuccessfully and the fingerprint is collected overtime.

Specifically, Embodiment 4 further includes that the fingerprint card determines whether any user fingerprint is collected in a preset duration, if yes, returns the response that the fingerprint is added successfully to the upper computer; otherwise, returns the response of overtime to the upper computer;

Step 318, the fingerprint card sets serial numbers for the collected fingerprints;

optionally, in Embodiment 4, setting the serial numbers for fingerprints specifically is that numbering the collected fingerprints.

Step 319, the fingerprint sends the adding fingerprint response to the upper computer, the upper computer sends the adding fingerprint response to the server, and entering fingerprint is finished;

in Embodiment 4, the adding fingerprint response includes serial number of fingerprint;

Step 320, the upper computer sends the obtaining fingerprint information instruction to the server, the server encrypts the obtaining fingerprint information instruction and returns the obtaining fingerprint information which is encrypted to the upper computer, and the upper computer sends the obtaining fingerprint information which is encrypted to the fingerprint card;

in Embodiment 4, the details about the server encrypting the obtaining fingerprint information instruction are shown in Step 212 in Embodiment 3, no more details will be given herein.

Step 321, the fingerprint card decrypts the received instruction and returns the fingerprint information to the upper computer;

in Embodiment 4, the details about the fingerprint card decrypting the obtaining fingerprint information which is encrypted are shown in Step 213 in Embodiment 3, no more details will be given herein.

Step 322, the upper computer determines whether the number of fingerprints in the fingerprint information equals the second preset value, if yes, the fingerprint is deleted unsuccessfully, a failure response is returned to the server; otherwise, goes to Step 323;

in Embodiment 4, in the case that the number of fingerprints in the fingerprint information equals the second preset value, the fingerprint cannot be deleted, specifically, the second preset value is 1.

Step 323, the upper computer receives the serial number of fingerprint which is being deleted by the user, sends a deleting fingerprint instruction including the serial number of fingerprint to the server, and the server encrypts the deleting fingerprint instruction and returns the deleting fingerprint instruction which is encrypted to the upper computer; and the upper computer returns the deleting fingerprint instruction which is encrypted to the fingerprint card;

the server encrypts the deleting fingerprint instruction sent from the upper computer by using the first key which is preset via the first preset algorithm to obtain deleting fingerprint instruction ciphertext, and sends the instruction which is encrypted to the upper computer;

or, the server operates the second preset algorithm on the deleting fingerprint instruction sent from the upper computer by using the second key which is preset to generate the first check value, and sends the instruction sent from the upper computer and the first check value to the upper computer;

or, after the server encrypts the deleting fingerprint instruction sent from the upper computer by using the first key which is preset to obtain the deleting fingerprint instruction ciphertext, the server operates the second preset algorithm on the instruction sent from the upper computer by using the second key which is preset to generate the first check value, and sends the deleting fingerprint instruction ciphertext and the first check value to the upper computer; and it needs to be noted that the server obtains the first key and/or the second key according to the fingerprint card information and presets the first key and/or the second key in the server; correspondingly, the server needs to send the first key and/or the second key to the fingerprint card and saves them before the fingerprint card is issued.

Specifically, the deleting fingerprint instruction sent from the upper computer to the server is 80D200020201.

Optionally, in Embodiment 4, after receiving the fingerprint to be deleted by the user, the upper computer prompts that the fingerprint is deleted or not. In the case that a confirmation deletion response is received from the user, the upper computer sends the deleting fingerprint instruction including the serial number of the fingerprint to the server; and Step 324, the fingerprint card decrypts the received instruction, finds a corresponding fingerprint according to the serial number, deletes the fingerprint, and sends the deleting fingerprint response to the upper computer, and the upper computer sends the deleting fingerprint response to the server, and the process of deleting fingerprint is finished.

In Embodiment 4, the fingerprint card decrypting the received instruction specifically is that the fingerprint card decrypts the deleting fingerprint instruction ciphertext sent from the upper computer by using the first key which is preset via the first preset algorithm to obtain the deleting fingerprint instruction plaintext;

or, after receiving the instruction sent from the upper computer, the fingerprint card operates the second preset algorithm on the instruction by using the second key which is preset to generate the second check value, and determines whether the second check value is the same as the first check value, if yes, deletes the fingerprint according to the deleting fingerprint instruction sent from the upper computer; otherwise, returns error information to the upper computer;

or, after receiving the instruction sent from the upper computer, the fingerprint card operates the second preset algorithm on the instruction by using the second key which is preset to generate the second check value, determines whether the second check value is the same as the first check value received, if yes, decrypts by using the first key which is preset via the first preset algorithm to obtain the deleting fingerprint instruction plaintext, and deletes the fingerprint; otherwise, returns error information to the upper computer;

specifically, in Embodiment 4, the deleting fingerprint response returned from the fingerprint card includes fingerprint is deleted successfully and the fingerprint is deleted unsuccessfully.

Optionally, in Embodiment 4, steps from Step 301 to Step 311 can be substituted by steps from Step 201' to Step 211' which are shown in Embodiment 3, no more details will be given herein.

Embodiment 5

Figure 5A:
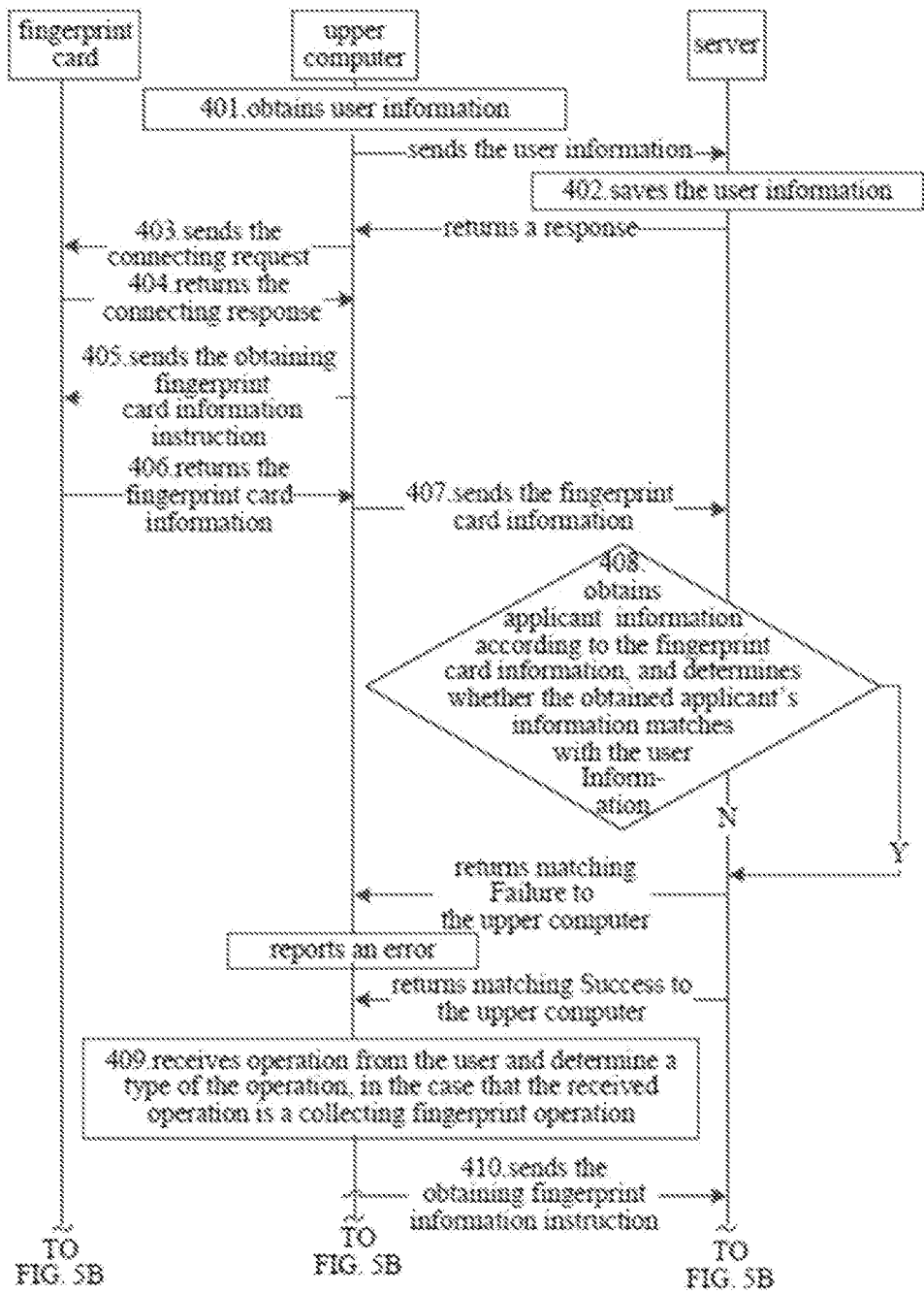
FIGS. 5A-5B show a flow diagram of a method for managing a fingerprint according to Embodiment 5 of the present disclosure.
Figure 5B:
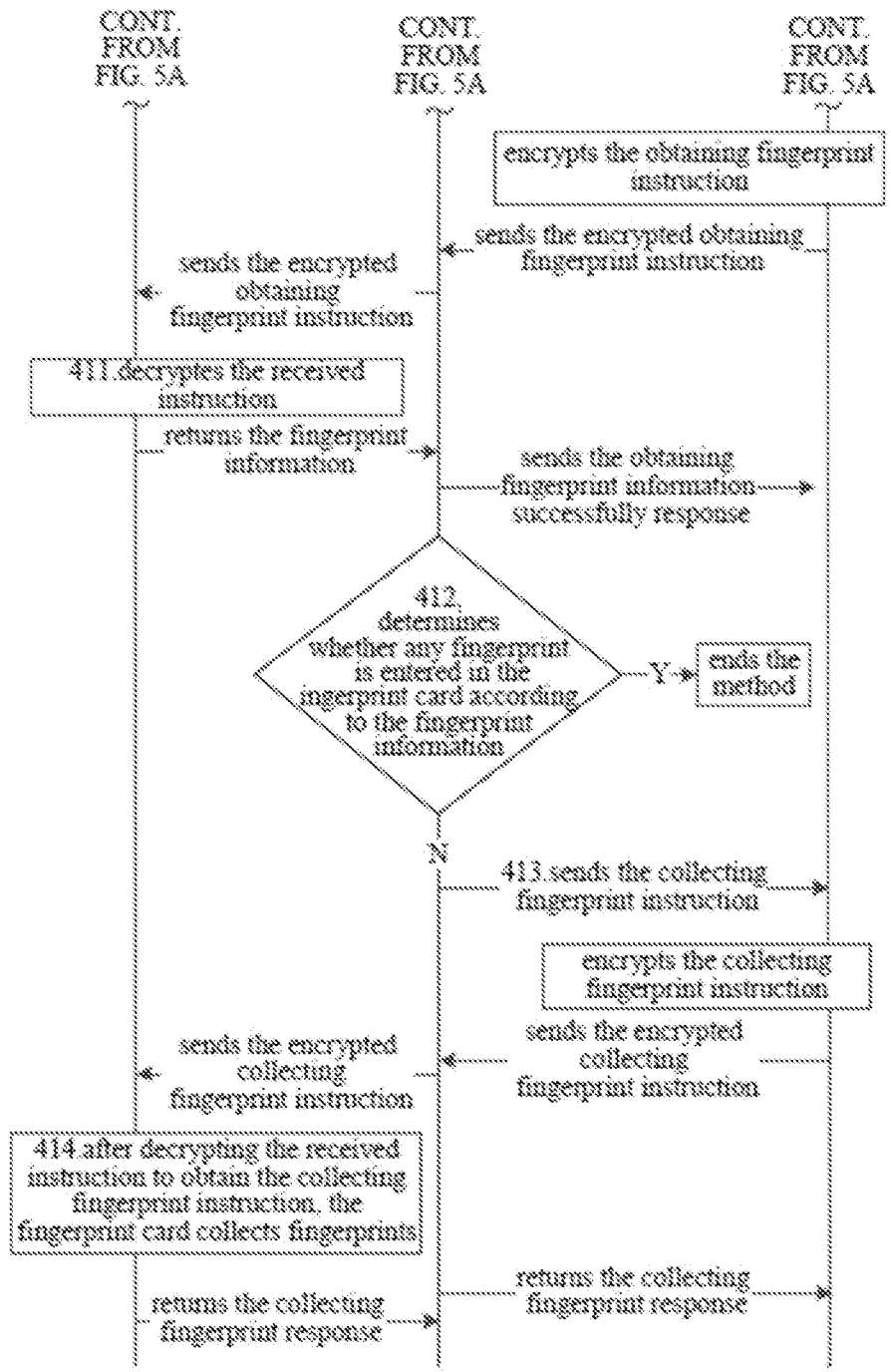

It provides a method for managing a fingerprint according to Embodiment 5, which applies to a system including a fingerprint card, an upper computer and a server, in which, the upper computer can be a mobile terminal, a PC or a card reader which can be equipped with applets; and the system further includes a terminal, which specifically is a mobile terminal, such as, a mobile phone, which can receive an incoming call massage or information. As shown in FIGS. 5A-5B, the method specifically includes:

Step 401, the upper computer obtains user information and sends the user information to a server;

in Embodiment 5, the user enters the user information to login the applet; specifically, the user information includes a name and an ID number of a user.

Step 402, the server saves the user information and returns a response to the upper computer;

it needs to be noted that before the server saves the user information, the method further includes that the server searches from its own database and perform comparison according to the user information, if the user information is found and the comparison is performed successfully, sends a response that the user information is authenticated successfully to the upper computer; otherwise, sends a response that the user information is authenticated unsuccessfully to the upper computer.

Step 403, the upper computer sends a connecting request to a fingerprint card;

Step 404, the fingerprint card returns a connecting response to the upper computer;

Step 405, the upper computer sends an obtaining fingerprint card information instruction to the fingerprint card;

Step 406, the fingerprint card returns fingerprint card information to the upper computer;

In Embodiment 5, the fingerprint card information returned includes a card number of a fingerprint card, a name and an ID number of an applicant, an expire date and a safety code, etc.

Step 407, the upper computer sends the fingerprint card information to the server;

Step 408, the server obtains corresponding applicant information according to the fingerprint card information, and determines whether the obtained applicant information matches with the user information, if yes, returns a matching success to the upper computer; otherwise, returns a matching failure to the upper computer, and the upper computer reports an error;

Step 409, the upper computer receives an operation from the user and determines a type of the operation, goes to Step 410 in the case that the received operation is a collecting fingerprint operation;

Step 410, the upper computer sends the obtaining fingerprint information instruction to the server, the server encrypts the obtaining fingerprint information instruction and sends the obtaining fingerprint information instruction which is encrypted to the upper computer, and the upper computer sends the obtaining fingerprint information which is encrypted to the fingerprint card;

In Embodiment 5, more details about the server encrypting the obtaining fingerprint information are shown in Step 212 in Embodiment 3, no more details will be given herein.

Step 411, the fingerprint card decrypts the received instruction, and returns the fingerprint information to the upper computer;

In Embodiment 5, more details about the fingerprint card decrypting the obtaining fingerprint information instruction which is encrypted are shown in Step 213 in Embodiment 3, no more details will be given herein.

Step 412, the upper computer determines whether any fingerprint is entered in the fingerprint card according to the fingerprint information, if yes, ends the process; otherwise, sends a collecting fingerprint instruction to the fingerprint card, and goes to Step 413;

In Embodiment 5, the fingerprint information specifically includes the number of fingerprints saved in the fingerprint card and a serial number of fingerprints; specifically, the upper computer determines whether any fingerprint is entered according to the number of fingerprints in the fingerprint information.

Step 413, the upper computer sends the collecting fingerprint instruction to the server, the server encrypts the collecting fingerprint instruction, and sends the collecting fingerprint instruction which is encrypted to the upper computer; and the upper computer sends the encrypted instruction to the fingerprint card;

In Embodiment 5, more details about the server encrypting the collecting fingerprint instruction are shown in Step 216 in Embodiment 3, no more details will be given herein.

Step 414, after decrypting the received instruction to obtain the collecting fingerprint instruction, the fingerprint card collects fingerprints, and returns the collecting fingerprint response to the upper computer, and the upper computer returns the collecting fingerprint response to the server, and ends the process.

In Embodiment 5, details about the fingerprint card decrypting the collecting fingerprint instruction are shown in Step 218 in Embodiment 3, no more details will be given herein.

Embodiment 6

Figure 6:
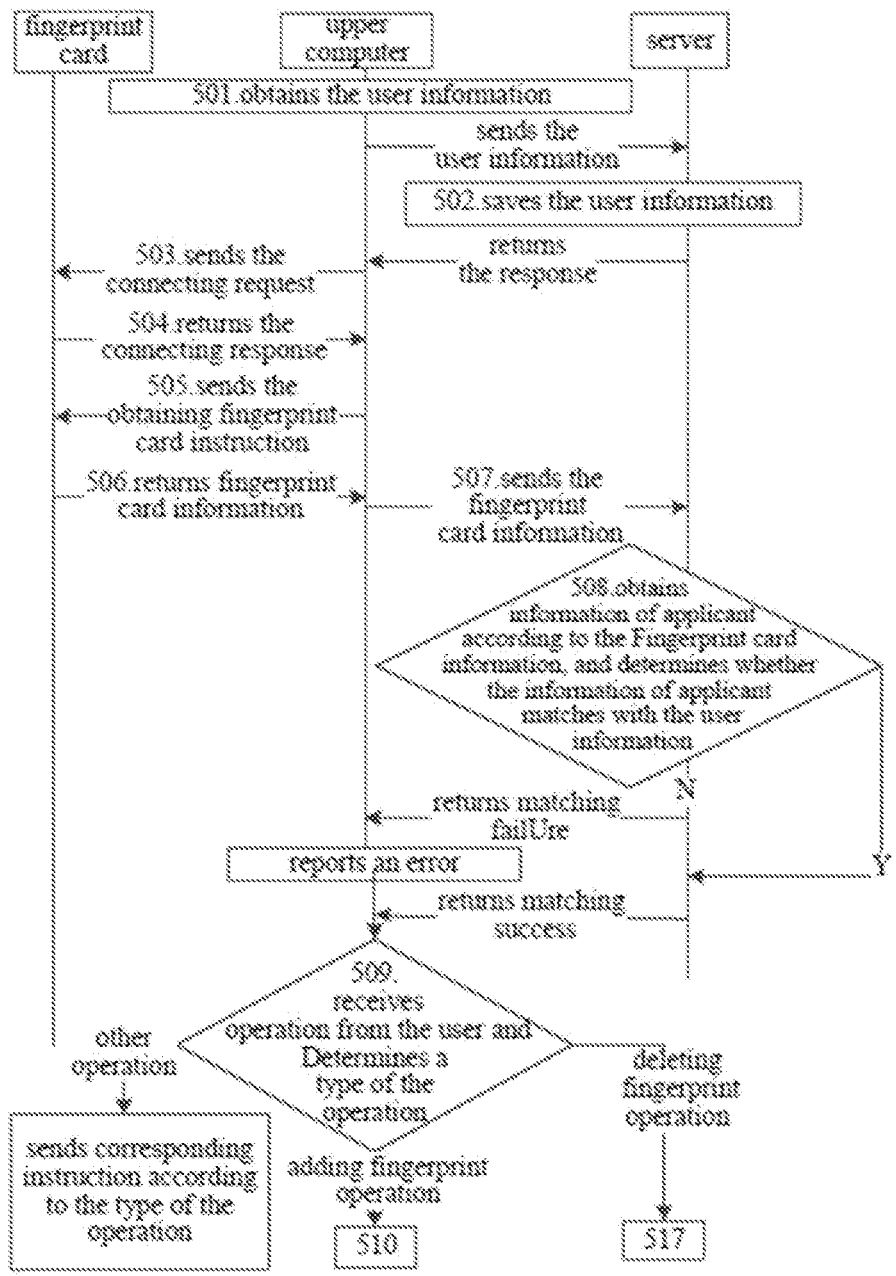
FIG. 6 and FIGS. 7A-7B show a flow diagram of a method for managing a fingerprint according to Embodiment 6 of the present disclosure.
Figure 7A:
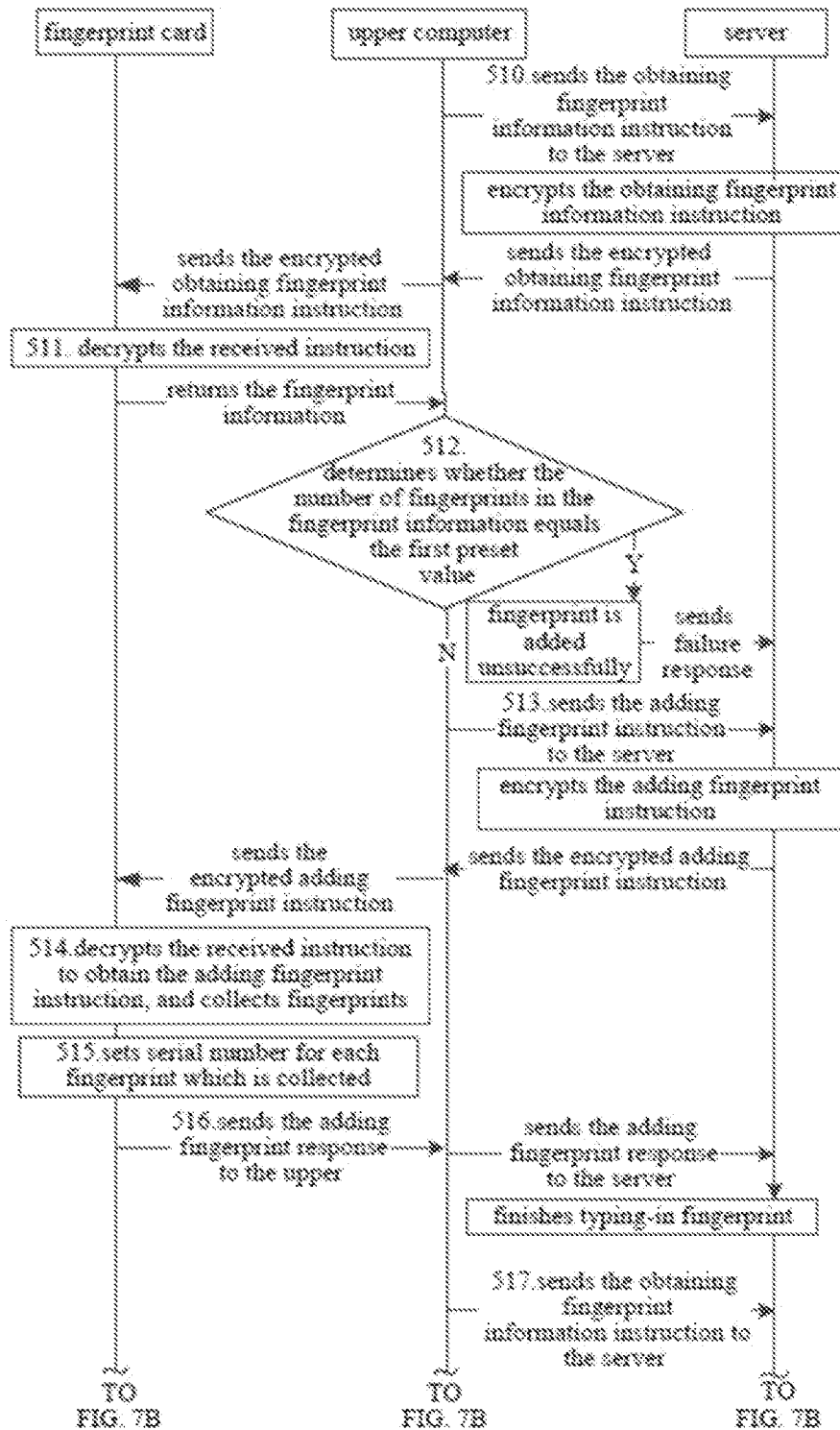
Figure 7B:
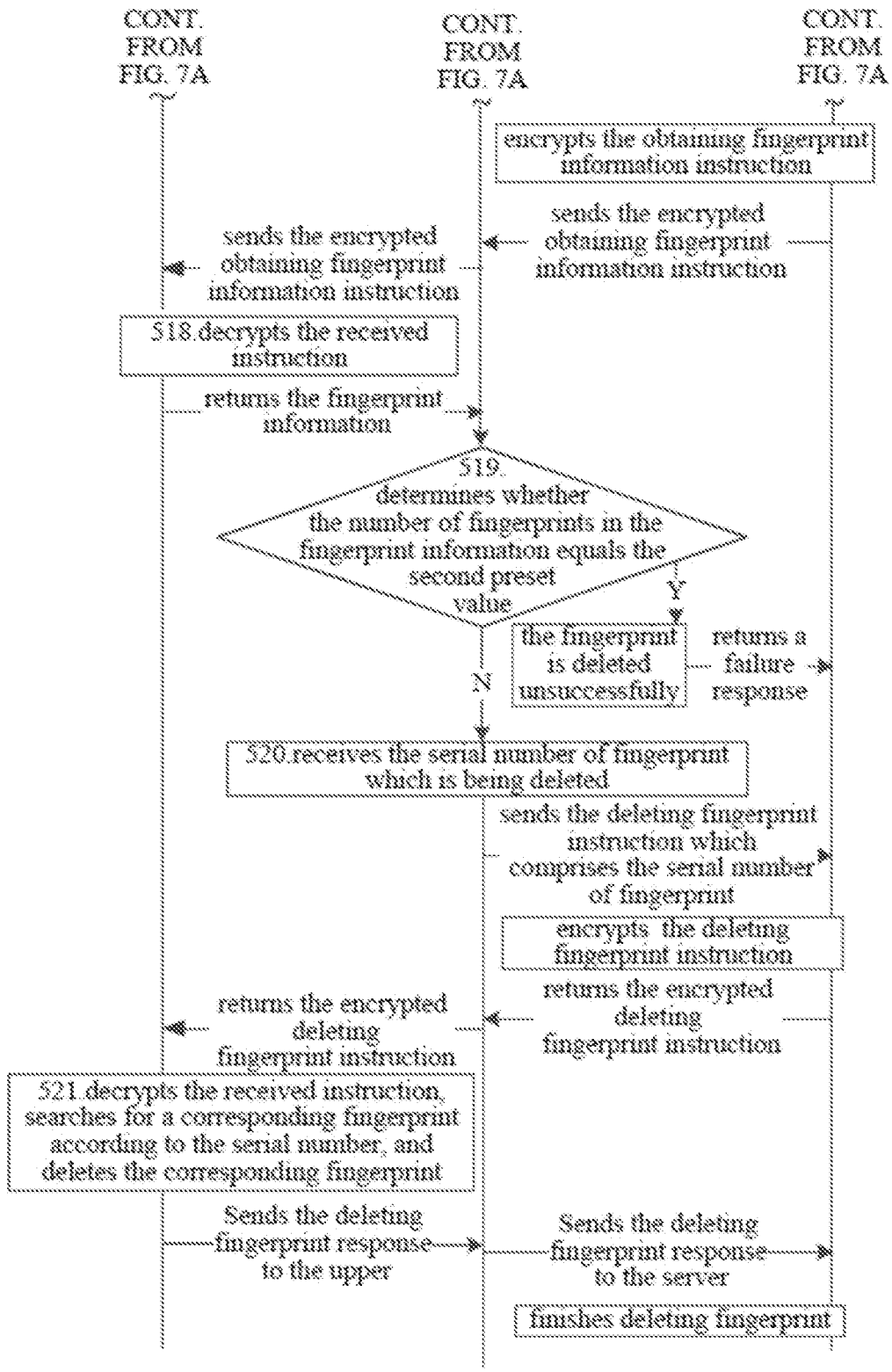

It provides a method for managing a fingerprint according to Embodiment 6, which applies to a system including a fingerprint card, an upper computer and a server, in which, the upper computer can be a mobile terminal, a PC or a card reader which can be equipped with applets. As shown in FIG. 6 and FIGS. 7A-7B, the method specifically includes:

Step 501, the upper computer obtains user information, and sends the user information to the server;

Step 502, the server saves the user information, and returns a response to the upper computer; and it needs to be noted that before the server saves the user information, the method further includes the server searches from its own database and compares according to the user information, if the user information is searched and compared successfully, sends a user information authentication success response to the upper computer; otherwise, sends a user information authentication failure response to the upper computer.

Step 503, the upper computer sends a connecting request to the fingerprint card;

Step 504, the fingerprint card returns a connecting response to the upper computer;

Step 505, the upper computer sends an obtaining fingerprint card information instruction to the fingerprint card;

Step 506, the fingerprint card returns fingerprint card information to the upper computer;

in Embodiment 6, the returned fingerprint card information includes a card number of the fingerprint card, a name and an ID number of an applicant, an expire date and a safety code, etc.

Step 507, the upper computer sends the fingerprint card information to the server;

Step 508, the server obtains corresponding applicant information according to the fingerprint card information, and determines whether the obtained applicant information matches with the user information, if yes, returns a matching success to the upper computer, and goes to Step 509; otherwise, returns a matching failure to the upper computer, and the upper computer reports an error;

Step 509, the upper computer receives an operation from the user and determines a type of the operation, goes to Step 510 in the case that the operation is an adding fingerprint operation; goes to Step 517 in the case that the operation is deleting fingerprint operation; and sends corresponding instruction according to the type of operation in the case that the operation is another type;

Step 510, the upper computer sends the obtaining fingerprint information instruction to the server, the server encrypts the obtaining fingerprint information instruction, sends the obtaining fingerprint information instruction which is encrypted to the upper computer; and the upper computer sends the obtaining fingerprint information instruction which is encrypted to the fingerprint card;

in Embodiment 6, details about the server encrypting the obtaining fingerprint information instruction are shown in Step 212 in Embodiment 3, no more details will be given herein.

Step 511, the fingerprint card decrypts the received instruction, and returns the fingerprint information to the upper computer;

in Embodiment 6, details about the fingerprint card decrypting the obtaining fingerprint information instruction which is encrypted are shown in Step 213 in Embodiment 3, no more details will be given herein.

Step 512, the upper computer determines whether the number of fingerprints in the fingerprint information equals the first preset value, if yes, the fingerprint is added unsuccessfully, and a failure response is sent to the server; otherwise, goes to Step 513;

In Embodiment 6, in the case that the number of fingerprints in the fingerprint information equals the first preset value, no fingerprint can be added, thus, the fingerprint is added unsuccessfully.

Step 513, the upper computer sends the adding fingerprint instruction to the server, the server encrypts the adding fingerprint instruction, and sends the adding fingerprint instruction which is encrypted to the upper computer; the upper computer sends the adding fingerprint instruction which is encrypted to the fingerprint card; and in Embodiment 6, details about the server encrypting the adding fingerprint instruction are shown in Step 316 in Embodiment 4, no more details will be given herein.

Step 514, after decrypting the instruction received to obtain the adding fingerprint instruction, the fingerprint card collects fingerprints;

in Embodiment 6, details about the fingerprint card decrypting the adding fingerprint instruction are shown in Step 317 in Embodiment 4, no more details will be given herein.

In Embodiment 6, the fingerprint card collects fingerprint data for several times according to the instruction sent from the server via the upper computer, the fingerprint card sends an entering response to the upper computer after the fingerprint is collected for each time; specifically, the entering response includes that fingerprint is entered successfully, the fingerprint is entered unsuccessfully and the fingerprint is entered overtime.

Step 515, the fingerprint card sets serial number for each fingerprint which is collected;

Optionally, in Embodiment 6, setting serial number for each fingerprint specifically is numbering each collected fingerprint.

Step 516, the fingerprint card sends the adding fingerprint response to the upper computer; the upper computer sends the adding fingerprint response to the server, and entering fingerprint is finished;

Step 517, the upper computer sends the obtaining fingerprint information instruction to the server, the server encrypts the obtaining fingerprint information, and sends the obtaining fingerprint information which is encrypted to the upper computer; the upper computer sends the obtaining fingerprint information which is encrypted to the fingerprint card;

In Embodiment 6, details about the server encrypting the obtaining fingerprint information instruction are shown in Step 212 in Embodiment 3, no more details will be given herein.

Step 518, the fingerprint card decrypts the received instruction, and returns the fingerprint information to the upper computer;

in Embodiment 6, details about the fingerprint card decrypting the obtaining fingerprint information instruction are shown in Step 213 in Embodiment 3, no more details will be given herein.

Step 519, the upper computer determines whether the number of fingerprints in the fingerprint information equals the second preset value, if yes, the fingerprint is deleted unsuccessfully, and a failure response is sent to the server; otherwise, goes to Step 520;

in Embodiment 6, in the case that the number of fingerprints in the fingerprint information equals the second preset value, the fingerprint cannot be deleted; specifically, the second preset value is 1.

Step 520, the upper computer receives the serial number of fingerprint which is being deleted, and sends the deleting fingerprint instruction which includes the serial number of the fingerprint, the server encrypts the deleting fingerprint instruction, and returns the deleting fingerprint instruction which is encrypted to the upper computer; the upper computer returns the deleting fingerprint instruction which is encrypted to the fingerprint card;

in Embodiment 6, details about the server encrypting the deleting fingerprint instruction are shown in Step 323 in Embodiment 4, no more details will be given herein.

Specifically, the deleting fingerprint instruction sent from the upper computer to the server is 80D200020201.

Optionally, in Embodiment 6, after receiving the fingerprint which is being deleted by the user, the upper computer prompts the user whether deletes the fingerprint, in the case that a confirmation deletion response is received from the user, the upper computer sends the deleting fingerprint instruction including the serial number of the fingerprint to the server;

Step 521, the fingerprint card decrypts the received instruction, searches for a corresponding fingerprint according to the serial number, deletes the fingerprint, and sends the deleting fingerprint response to the upper computer, and the upper computer sends the deleting fingerprint response to the server, and the fingerprint is deleted.

In Embodiment 6, details about the fingerprint card decrypting the deleting fingerprint instruction are shown in Step 324 in Embodiment 4, no more details will be given herein.

Specifically, in Embodiment 6, the deleting fingerprint response returned from the fingerprint card includes that fingerprint is deleted successfully and the fingerprint is deleted unsuccessfully.

Embodiment 7

Figure 8:
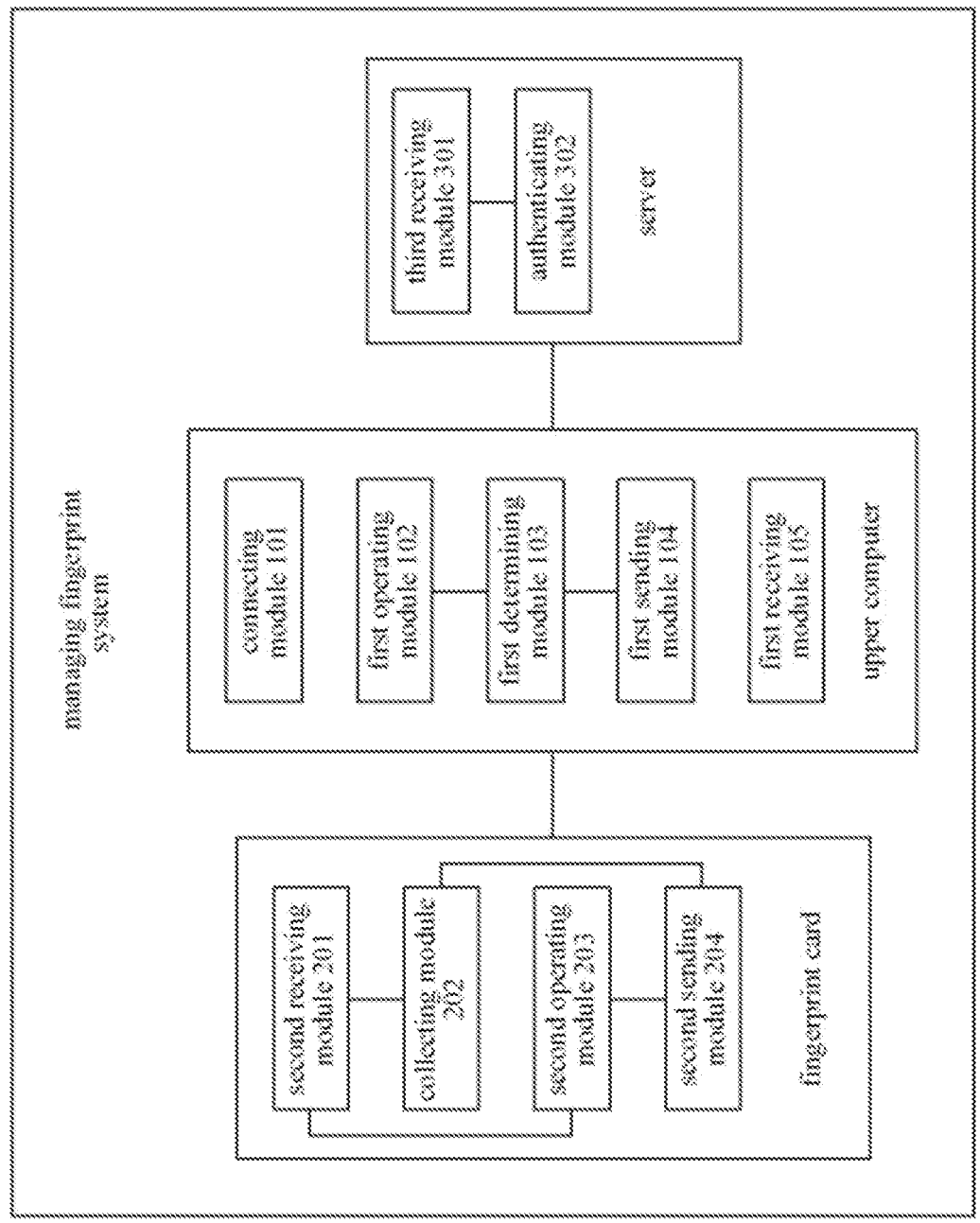
FIG. 8 shows a block diagram of a system for managing a fingerprint according to Embodiment 7 of the present disclosure.

It provides a system for managing a fingerprint according to Embodiment 7, as shown in FIG. 8, which includes an upper computer, a fingerprint card, and a server;

the upper computer specifically includes:

a connecting module 101 which is configured to connect to the fingerprint card;

a first operating module 102 which is configured to receive an operation from a user;

a first determining module 103 which is configured to determine a type of the operation from the user which is received by the first operating module 102;

a first sending module 104 which is configured to send a collecting fingerprint instruction to the fingerprint card when the first determining module 103 determines the operation from the user is the collecting fingerprint operation; the first sending module 104 is further configured to sends a managing fingerprint instruction to the fingerprint card in the case that the first determining module 103 determines that the operation from the user is the managing fingerprint operation;

a first receiving module 105 which is configured to receive the collecting fingerprint response returned from the fingerprint card; the first receiving module 105 is configured to receive the managing fingerprint response returned from the fingerprint;

the fingerprint card specifically includes:

a second receiving module 201 which is configured to receive the collecting fingerprint instruction sent from the upper computer; the second receiving module 201 is further configured to receive the managing fingerprint instruction sent from the upper computer;

a collecting module 202 which is configured to collect a fingerprint according to the collecting fingerprint instruction received by the second receiving module 201 to obtain the collecting fingerprint response;

a second operating module 203 which is configured to finish the operation of managing fingerprint according to the managing fingerprint instruction received by the second receiving module 201 to obtain the managing fingerprint response;

a second sending module 204 which is configured to return the collecting fingerprint response obtained by the collecting module 202 to the upper computer; the second sending module 204 is configured to return the managing fingerprint response obtained by the second operating module 203 to the upper computer;

the server specifically includes:

a third receiving module 301 which is configured to receive user information sent from the upper computer;

an authenticating module 302 which is configured to authenticate the user information received by the third receiving module 301.

Optionally, the connecting module 101 specifically includes a first sending unit and a first receiving unit;

the first sending unit is configured to send a connecting request to the fingerprint card;

the first receiving unit is configured to receive a connecting response returned from the fingerprint card;

the second sending module 204 is further configured to return the connecting response to the upper computer.

Optionally, the upper computer further includes a reading module and a reporting error module;

the reading module is configured to read information of the fingerprint card;

the first sending module 104 is further configured to send the information of the fingerprint card which is read by the reading module to the server;

the first receiving module 105 is further configured to receive a authentication success response which is returned from the server; the first receiving module 105 is further configured to receive a authentication failure response which is returned from the server;

the first operating module 102 is specifically configured to receive a user operation when the first receiving module 105 receives the authentication success response;

a reporting error module is configured to report an error when the first receiving module 105 receives the authentication failure response;

the server further includes a third sending module;

a third receiving module 301 is configured to receive the fingerprint card information sent from the upper computer;

the authenticating module 302 is further configured to authenticate the fingerprint card information received by the third receiving module 301;

the third sending module is configured to send the authentication success response to the upper computer when the fingerprint card information is authenticated successfully by the authenticating module 302; and is further configured to send the authentication failure response to the upper computer when the fingerprint card information is authenticated unsuccessfully.

Optionally, the reading module is specifically includes a second receiving unit and a second sending unit;

the second sending unit is configured to send a reading fingerprint card information instruction to the fingerprint card;

the second receiving unit is configured to receive fingerprint card information from the fingerprint card;

the second receiving module 201 is further configured to receive the reading fingerprint card information instruction sent from the upper computer; and the second sending module 204 is further configured to send the fingerprint card information to the upper computer.

Optionally, the first receiving module 105 is further configured to receive an authentication password entered by a user;

the first sending module 104 is further configured to send the authentication password received by the first receiving module 105 to the server;

the authenticating module 302 is further configured to authenticate the authentication password;

a third sending module is configured to send the authentication success response to the upper computer when the authentication password is authenticated successfully by the authenticating module 302; and the third sending module is further configured to send authentication failure response to the upper computer when the authentication password is authenticated unsuccessfully by the server.

Optionally, the authenticating module 302 is specifically configured to authenticate whether the authentication password entered by the user is the same as the authentication password generated by the server, if yes, the authentication password is authenticated successfully; otherwise, the authentication password is authenticated unsuccessfully.

Optionally, the server further includes a first obtaining module;

the first receiving module 105 is further configured to receive the fingerprint card information entered by the user;

the first sending module 104 is further configured to send the fingerprint card information, which is entered by the user, received by the first receiving module 105 to the server;

the third receiving module 301 is further configured to receive the fingerprint card information entered by the user which is sent from the upper computer;

the first obtaining module is configured to obtain a preset terminal number according to the fingerprint card information entered by the user which is received by the third receiving module 301;

the third sending module is further configured to send the authentication password generated by itself to a corresponding terminal according to the terminal number obtained by the first obtaining module.

Optionally, the authenticating module 302 is specifically configured to authenticate whether the fingerprint card information entered by the user is the same as the fingerprint card information received by the third receiving module 301, if yes, the authentication is success;

otherwise, the authentication fails.

Optionally, the server further includes a second determining module;

the third receiving module 301 is further configured to receive the fingerprint card information sent from the upper computer, and to obtain information of an applicant according to the fingerprint card information;

a second determining module is configured to determine whether the information of the applicant obtained by the third receiving module 301 matches with the user information sent from the upper computer;

the third sending module is specifically configured to send response that the information of the applicant is authenticated successfully to the upper computer when the second determining module determines that the information of the applicant matches with the user information sent from the upper computer; and the third sending module is further configured to send the response that the information of applicant is authenticated unsuccessfully to the upper computer when the second determining module determines that the information of the applicant does not match with the user information sent from the upper computer.

Optionally, the first receiving module 105 is further configured to obtain user information;

the first sending module 104 is further configured to send user information to the server;

the authenticating module 302 is specifically configured to search and compare the obtained user information in its own database;

the third sending module is further configured to send the response that user information is authenticated successfully to the upper computer if the authenticating module 302 found the user information and the user information is compared successfully; and is further configured to send the response that the user information is authenticated unsuccessfully to the upper computer if the authenticating module 302 dose not find the user information or the user information is compared unsuccessfully.

Optionally, the authenticating module 302 is further configured to obtain the fingerprint card information from its own database according to the user information, and obtain the information of the applicant according to the fingerprint card information, and determine whether the information of the applicant matches with the user information sent from the upper computer;

the third sending module is further configured to send the authentication success response to the upper computer if the authenticating module 302 determines that the information of the applicant matches the user information; and to send the authentication failure response to the upper computer if the authenticating module 302 determines that the information of the applicant does not match the user information.

Optionally, the upper computer further includes a second obtaining module and a third determining module;

the second obtaining module is configured to obtain fingerprint information in the fingerprint card;

the third determining module is configured to determine whether any fingerprint is typed-in the fingerprint card, if yes, the procedure is ended;

the first sending module 104 is further configured to send the collecting fingerprint instruction to the fingerprint card when the third determining module determines that no fingerprint is typed-in the fingerprint card.

Optionally, the second obtaining module specifically includes a third sending unit and a third receiving unit;

the third sending unit is configured to send the obtaining fingerprint information instruction to the fingerprint card;

the third receiving unit is configured to receive the fingerprint information returned from the fingerprint card;

the second receiving module 201 is configured to receive the obtaining fingerprint information instruction sent from the upper computer;

the second sending module 204 is configured to send the fingerprint information to the upper computer.

Optionally, the third determining module is specifically configured to determine whether any new fingerprint is typed-in according to the number of fingerprint in the fingerprint information.

Optionally, the fingerprint card further includes a serial number module;

the serial number module is configured to numbering fingerprints which are collected.

Optionally, the managing fingerprint instruction specifically is an adding fingerprint instruction;

the first sending module 104 is specifically configured to send the adding fingerprint instruction to the fingerprint card;

the first receiving module 105 is specifically configured to receive an adding fingerprint response returned from the fingerprint card;

the second receiving module 201 is further configured to receive the adding fingerprint instruction sent from the upper computer;

the collecting module 202 is specifically configured to collect the fingerprint according to the adding fingerprint instruction received by the second receiving module 201; and the second sending module 204 is further configured to return the adding fingerprint response to the upper computer.

Optionally, the upper computer further includes a second obtaining module which is configured to obtain the fingerprint information from the fingerprint card;

the third determining module is further configured to determine whether any fingerprint is typed-in the fingerprint card according to the fingerprint information;

the first sending module 104 is further configured to send the collecting fingerprint instruction to the fingerprint card if the third determining module determines that there is fingerprint which is typed-in the fingerprint card; the fingerprint is added unsuccessfully if the third determining module determines that there is no fingerprint which is typed-in the fingerprint card, and an error is reported.

Optionally, the third determining module is specifically configured to determine whether the number of fingerprints equals the first preset value, if yes, no fingerprint can be added; otherwise, the fingerprint can be added.

Optionally, the fingerprint card further includes a deleting module;

the managing fingerprint instruction specifically is a deleting fingerprint instruction;

the first sending module 104 is specifically configured to send the deleting fingerprint instruction to the fingerprint card;

the first receiving module 105 is specifically configured to receive a deleting fingerprint instruction returned from the fingerprint card;

the second receiving module 201 is further configured to receive the deleting fingerprint instruction sent from the upper computer;

the deleting module is specifically configured to delete the fingerprint according to the deleting fingerprint instruction received from the second receiving module 201;

the second sending module 204 is further configured to return the deleting fingerprint response to the upper computer.

Optionally, the upper computer further includes a second obtaining module which is configured to obtain the fingerprint information from the fingerprint card;

the third determining module is further configured to determine whether any fingerprint can be deleted from the fingerprint card according to the fingerprint information;

the first sending module 104 is further configured to send the deleting fingerprint instruction to the fingerprint card if the third determining module determines that there is a fingerprint which can be deleted; a fingerprint is deleted unsuccessfully if the third determining module determines that no fingerprint can be deleted, and an error is reported.

Optionally, the third determining module is specifically configured to determine whether the number of fingerprints in the fingerprint information equals the second preset value, if yes, no fingerprint can be deleted; otherwise, there is a fingerprint which can be deleted.

Optionally, the fingerprint card further includes the serial number module which is configured to number the collected fingerprint;

the first receiving module 105 is further configured to receive the serial number of fingerprint which is being deleted by the user;

the first sending module 104 is specifically configured to send the deleting fingerprint instruction which includes the serial number of fingerprint which is being deleted to the fingerprint card;

the deleting module is specifically configured to find the fingerprint which is being deleted according to the serial number, and to delete the found fingerprint.

Optionally, the collecting module 202 includes a first determining unit;

the first determining unit is configured to determine whether any user fingerprint is collected within a preset duration;

the second sending module 204 is further configured to return the response that fingerprint is collected successfully to the upper computer when the first determining unit determines that the user fingerprint is typed-in within the preset duration; the second sending module 204 is further configured to return the overtime response to the upper computer when the first determining unit determines that no user fingerprint is typed-in within the preset duration.

Optionally, the server further includes an encrypting module;

the first sending module 104 is specifically configured to send the collecting fingerprint instruction to the server; the first sending module 104 is further configured to receive the collecting fingerprint instruction which is encrypted from the server;

the third receiving module 301 is further configured to receive the collecting fingerprint instruction sent from the upper computer;

the encrypting module is configured to encrypt the collecting fingerprint instruction received by the third receiving module 301;

the third sending module is further configured to send the collecting fingerprint instruction which is encrypted by the encrypting module to the upper computer;

the first sending module 104 is further configured to send the collecting fingerprint instruction which is encrypted to the fingerprint card.

Optionally, the encrypting module is specifically configured to encrypt the collecting fingerprint instruction by using the first key which is preset via the first preset algorithm to obtain the collecting fingerprint instruction which is encrypted;

the third sending module is configured to send the collecting fingerprint instruction which is encrypted by the encrypting module to the upper computer.

Optionally, the encrypting module is specifically configured to operate the second preset algorithm on the collecting fingerprint instruction by using the second key which is preset to generate the first check value;

the third sending module is configured to send the collecting fingerprint instruction and the first check value to the upper computer.

Optionally, the encrypting module is specifically configured to encrypt the collecting fingerprint instruction sent from the upper computer by using the first key which is preset via the first preset algorithm to obtain the collecting fingerprint instruction which is encrypted, and to operate the second preset algorithm on the collecting fingerprint instruction by using the second key which is preset to generate the first check value;

the third sending module is configured to send the collecting fingerprint instruction which is encrypted and the first check value to the upper computer.

Optionally, the server further includes the encrypting module;

the first sending module 104 is specifically configured to send the collecting fingerprint instruction to the server; the first sending module 104 is further configured to receive the managing fingerprint instruction which is encrypted sent from the server;

the third receiving module 301 is further configured to receive the managing fingerprint instruction sent from the upper computer;

the encrypting module is configured to encrypt the managing fingerprint instruction received by the third receiving module 301;

the third sending module is further configured to the managing fingerprint instruction which is encrypted by the encrypting module to the upper computer; and the first sending module 104 is further configured to send the managing fingerprint instruction which is encrypted to the fingerprint card.

Optionally, the encrypting module is specifically configured to encrypt the managing fingerprint instruction by using the first key which is preset via the first preset algorithm to obtain the managing fingerprint instruction which is encrypted;

the third sending module is configured to send the managing fingerprint instruction which is encrypted by the encrypting module to the upper computer.

Optionally, the encrypting module is specifically configured to operate the second preset algorithm on the managing fingerprint instruction by using the second key which is preset to generate the first check value;

the third sending module is configured to send the managing fingerprint instruction and the first check value to the upper computer.

Optionally, the encrypting module is specifically configured to operate the second preset algorithm on the managing fingerprint instruction by using the second key which is preset to generate the first check value after encrypting the managing fingerprint instruction sent from the upper computer by using the first key which is preset via the first preset algorithm to obtain the managing fingerprint instruction which is encrypted; and the third sending module is configured to send the managing fingerprint instruction which is encrypted and the first check value to the upper computer.

The above are only preferred implementations of the present disclosure, but the scope of the present disclosure is not limited thereto. Any changes or substitutions that can be easily thought by those skilled in the art within the scope of the disclosed technology of the present disclosure shall be covered by the scope of the present disclosure. Therefore, the protection scope of the present disclosure should be subject to the scope of the claims.

What is claimed is:

1. A method for managing a fingerprint, comprising:
   Step S1, building, by an upper computer, a connection with a fingerprint card;
   Step S2, receiving, by the upper computer, an operation from a user;
   Step S3, determining, by the upper computer, a type of the operation from the user, in the case that the operation is a collecting fingerprint operation, sending, by the upper computer, a collecting fingerprint instruction to the fingerprint card, collecting, by the fingerprint card, a fingerprint and returning a collecting fingerprint response to the upper computer; in the case that the operation is a managing fingerprint operation, sending, by the upper computer, the managing fingerprint instruction to the fingerprint card, finishing, by the fingerprint card, a managing operation on the fingerprint according to the managing fingerprint instruction, and returning the managing fingerprint response to the upper computer;
   wherein Step S1 further comprises: receiving, by a server, user information sent from the upper computer and authenticating the user information; and
   wherein after the server authenticates the user information, the method further comprises: obtaining, by the server, fingerprint card information from its own database according the user information, obtaining applicant information according to the fingerprint card information, and determining whether the applicant information matches the user information sent from the upper computer, if yes, sending an authentication success response; otherwise, sending an authentication failure response.

2. The method as claimed in claim 1, wherein Step S1 further comprises: obtaining, by the upper computer, the user information and sending the user information to the server; and
   the receiving, by a server, the user information sent from the upper computer and authenticating the user information specifically is: receiving, by the server, the user information sent from the upper computer and searching from its own database for information which is compared with the user information, in the case that the information is found and is compared successfully with the user information, sending a response that the user information is authenticated successfully to the upper computer; otherwise, sending a response that the user information is authenticated unsuccessfully to the upper computer.

3. The method as claimed in claim 1, wherein before the upper computer sends the collecting fingerprint instruction to the fingerprint card, the method further comprises: obtaining, by the upper computer, fingerprint information from the fingerprint card, determining whether any fingerprint is entered the fingerprint card according to the fingerprint information, if yes, ending the method; otherwise, sending the collecting fingerprint instruction to the fingerprint card.

4. The method as claimed in claim 1, wherein the managing fingerprint instruction comprises an adding fingerprint instruction; and
   the sending the managing fingerprint instruction to the fingerprint card, finishing, by, the fingerprint card, a managing operation on the fingerprint according to the managing fingerprint instruction, and returning the managing fingerprint response to the upper computer comprises: sending, by the upper computer, the adding fingerprint instruction to the fingerprint card, collecting, by the fingerprint card, a fingerprint, and returning an adding fingerprint response to the upper computer.

5. The method as claimed in claim 4, wherein before the upper computer sends the adding fingerprint instruction to the fingerprint card, the method further comprises: obtaining, by the upper computer, fingerprint information from the fingerprint card, and determining whether any fingerprint can be added in the fingerprint card according to the fingerprint information, if yes, sending the collecting fingerprint instruction to the fingerprint card; otherwise, the fingerprint is added unsuccessfully, and reporting an error.

6. The method as claimed in claim 1, wherein, the managing fingerprint instruction comprises a deleting fingerprint instruction; and
   the sending the managing fingerprint instruction to the fingerprint card, finishing, by the fingerprint card, a managing operation on the fingerprint according to the managing fingerprint instruction, and returning the managing fingerprint response to the upper computer comprises: sending, by the upper computer, the deleting fingerprint instruction to the fingerprint card, deleting, by the fingerprint card, the fingerprint, and returning the deleting fingerprint response to the upper computer.

7. The method as claimed in claim 6, wherein before the upper computer sends the deleting fingerprint instruction to the upper computer, the method further comprises: obtaining, by the upper computer, fingerprint information from the fingerprint card, determining whether any fingerprint can be deleted according to the fingerprint information, if yes, sending the deleting fingerprint instruction to the fingerprint card; otherwise, the fingerprint is deleted unsuccessfully, and reporting an error.

8. The method as claimed in claim 1, wherein collecting, by the fingerprint card, a fingerprint further comprises: determining, by the fingerprint card, whether any user fingerprint is collected within a preset duration, if yes, returning a response that fingerprint is collected successfully to the upper computer; otherwise, returning a response that the fingerprint is collected overtime to the upper computer.

9. The method as claimed in claim 1, wherein the sending, by the upper computer, a collecting fingerprint instruction to the fingerprint card specifically is: sending, by the upper computer, the collecting fingerprint instruction to the server, encrypting, by the server the collecting fingerprint instruction and sending the collecting fingerprint instruction which is encrypted to the upper computer, sending, by the upper computer, the collecting fingerprint instruction which is encrypted to the fingerprint card.

10. A system for managing a fingerprint, comprising: an upper computer, a fingerprint card and a server;
    wherein the upper computer comprises:
    at least one first processor;
    a first communication interface connected with the at least one first processor; and a first memory connected with the at least one first processor;

wherein first instructions, when executed by the at least one first processor, cause the at least one first processor to:

build a connection with the fingerprint card;

receive, through the first communication interface, an operation from a user;

determine a type of the operation from the user;

send, through the first communication interface, a collecting fingerprint instruction to the fingerprint card in the case that the at least one first processor determines that the operation is a collecting fingerprint operation; and send, through the first communication interface, a managing fingerprint instruction to the fingerprint card in the case that the at least one first processor determines that the operation is a managing fingerprint operation;

receive, through the first communication interface, a collecting fingerprint response returned from the fingerprint card; and further receive, through the first communication interface, the managing fingerprint response returned from the fingerprint card;

the fingerprint card comprises:

at least one second processor;

a second communication interface connected with the at least one second processor; and a second memory connected with the at least one second processor;

wherein second instructions, when executed by the at least one second processor, cause the at least one second processor to:

receive, through the second communication interface, the collecting fingerprint instruction sent from the upper computer; and further receive, through the second communication interface, the managing fingerprint instruction sent from the upper computer;

collect a fingerprint according to the collecting fingerprint instruction received by the second communication interface and obtain a collecting fingerprint response;

finish a managing operation on the fingerprint according to the managing fingerprint instruction received by the second communication interface to obtain a managing fingerprint response;

return the collecting fingerprint response obtained by the at least one second processor to the upper computer; and return the managing fingerprint response obtained by the at least one second processor to the upper computer; and the server comprises:

at least one third processor;

a third communication interface connected with the at least one third processor; and a third memory connected with the at least one third processor;

wherein third instructions, when executed by the at least one third processor, cause the at least one third processor to:

receive, through the third communication interface, user information sent from the upper computer; and authenticate the user information received by the third communication interface;

wherein the at least one third processor is further configured to:

obtain the fingerprint card information from its own database according to the user information, obtain applicant information according to the fingerprint card information, and determine whether the applicant information matches the user information sent from the upper computer; and send, through the third communication interface, an authentication success response to the upper computer in the case that the at least one third processor determines that the applicant information matches the user information; and send, through the third communication interface, an authentication failure response in the case that the at least one third processor determines that the applicant information does not match the user information.

11. The system as claimed in claim 10, wherein the at least one first processor is further configured to:

obtain the user information;

send, through the first communication interface, the user information to the server;

the at least one third processor is further configured to:

search from its own database for information which is compared with the user information; and send, through the third communication interface, a response that the user information is authenticated successfully in the case that the at least one third processor finds the information which is compared with the user information successfully; and send, through the third communication interface, a response that the user information is authenticated unsuccessfully in the case that the at least one third processor dose not find the information or the information is compared with the user information unsuccessfully.

12. The system as claimed in claim 10, wherein the at least one first processor is further configured to:

obtain fingerprint information from the fingerprint card;

determine whether any fingerprint is entered the fingerprint card according to the fingerprint information, if yes, ending the method; and send, through the first communication interface, the collecting fingerprint instruction to the fingerprint card in the case that the at least one first processor determines that no fingerprint is entered the fingerprint card.

13. The system as claimed in claim 10, wherein the managing fingerprint instruction is an adding fingerprint instruction;

the at least one first processor is further configured to:

send, through the first communication interface, the adding fingerprint instruction to the fingerprint card;

receive, through the first communication interface, an adding fingerprint response returned from the fingerprint card;

the at least one second processor is further configured to:

receive, through the second communication interface, the adding fingerprint instruction sent from the upper computer;

collect a fingerprint according to the adding fingerprint instruction received by the second communication interface; and return the adding fingerprint response to the upper computer.

14. The system as claimed in claim 13, wherein the at least one first processor is further configured to:

obtain fingerprint information from the fingerprint card;

determine whether the fingerprint card has entered a fingerprint according to the fingerprint information; and send, through the first communication interface, the collecting fingerprint instruction to the fingerprint card in the case that a determination determined by the at least one first processor is yes; and the fingerprint is added unsuccessfully in the case that the determination determined by the at least one first processor is no, and an error is reported.

15. The system as claimed in claim 10, wherein the managing fingerprint instruction is a deleting fingerprint instruction;
the at least one first processor is further configured to:
send, through the first communication interface, the deleting fingerprint instruction to the fingerprint card;
receive, through the first communication interface, the deleting fingerprint response returned from the fingerprint card;
the at least one second processor is further configured to:
receive, through the second communication interface, the deleting fingerprint instruction sent from the upper computer;
delete the fingerprint according to the deleting fingerprint instruction received by the second communication interface; and
return the deleting fingerprint response to the upper computer.

16. The system as claimed in claim 15, wherein the at least one first processor is further configured to:
obtain fingerprint information from the fingerprint card;
determine whether any fingerprint can be deleted from the fingerprint card according to the fingerprint information; and
send, through the first communication interface, the deleting fingerprint instruction to the fingerprint card when a determination determined by the at least one first processor is yes; and the fingerprint is deleted unsuccessfully and an error is reported when the determination is determined by the at least one first processor is no.

17. The system as claimed in claim 10, wherein the at least one first processor is further configured to:
send, through the first communication interface, the collecting fingerprint instruction to the server; and receive, through the first communication interface, the collecting fingerprint instruction which is encrypted sent from the server;
the at least one third processor is further configured to:
receive, through the third communication interface, the collecting fingerprint instruction sent from the upper computer;
encrypt the collecting fingerprint instruction received by the third communication interface;
send, through the third communication interface, the collecting fingerprint instruction which is encrypted by the at least one third processor to the upper computer; and
the at least one first processor is further configured to:
send, through the first communication interface, the collecting fingerprint instruction which is encrypted to the fingerprint card.

18. The system as claimed in claim 10, wherein the at least one first processor is further configured to:
send, through the first communication interface, the collecting fingerprint instruction to the server; and receive the managing fingerprint instruction which is encrypted sent from the server;
the at least one third processor is further configured to:
receive, through the third communication interface, the managing fingerprint instruction sent from the upper computer;
encrypt the managing fingerprint instruction received by the third communication interface;
send, through the third communication interface, the managing fingerprint instruction which is encrypted by the at least one third processor to the upper computer; and
the at least one first processor is further configured to:
send, through the first communication interface, the managing fingerprint instruction which is encrypted to the fingerprint card.

\* \* \* \* \*